United States Patent
Komatsu

(10) Patent No.: US 8,300,322 B2
(45) Date of Patent: Oct. 30, 2012

(54) VARIABLE MAGNIFICATION OPTICAL SYSTEM AND IMAGING APPARATUS

(75) Inventor: Daiki Komatsu, Saitama (JP)

(73) Assignee: Fujifilm Corporation, Tokyo (JP)

( * ) Notice: Subject to any disclaimer, the term of this patent is extended or adjusted under 35 U.S.C. 154(b) by 57 days.

(21) Appl. No.: 13/108,426

(22) Filed: May 16, 2011

(65) Prior Publication Data

US 2011/0279906 A1 Nov. 17, 2011

(30) Foreign Application Priority Data

May 17, 2010 (JP) .................................. 2010-113156

(51) Int. Cl.
G02B 15/14 (2006.01)

(52) U.S. Cl. ........................................................ 359/691

(58) Field of Classification Search .................... 359/691
See application file for complete search history.

(56) References Cited

U.S. PATENT DOCUMENTS

| | | | |
|---|---|---|---|
| 5,054,897 | A | 10/1991 | Ozawa |
| 6,333,824 | B1 * | 12/2001 | Morooka ...................... 359/692 |
| 6,532,114 | B1 | 3/2003 | Kohno et al. |
| 7,554,748 | B2 | 6/2009 | Zeng et al. |
| 7,800,835 | B2 | 9/2010 | Izuhara et al. |
| 2007/0053070 | A1 | 3/2007 | Zeng et al. |
| 2009/0290227 | A1 | 11/2009 | Izuhara et al. |

FOREIGN PATENT DOCUMENTS

| | | |
|---|---|---|
| JP | 2901066 | 6/1999 |
| JP | 2006-119574 | 5/2006 |
| JP | 2008-310035 | 12/2008 |
| JP | 2008-310133 | 12/2008 |

OTHER PUBLICATIONS

European Search Report—EP 11 16 6174—Sep. 16, 2011.

* cited by examiner

*Primary Examiner* — William Choi
(74) *Attorney, Agent, or Firm* — Young & Thompson

(57) ABSTRACT

A variable magnification optical system includes a negative first lens group, a stop and a positive second lens group, arranged from the object side in the order mentioned above. The magnification of the variable magnification optical system is changed by changing a distance between the first lens group and the second lens group in the direction of an optical axis. The first lens group includes a negative plastic lens, and the second lens group includes a positive plastic lens. Further, the following formulas (1) and (2) are satisfied: $5.0<fpp/fw<7.5$ (1); and $-7.0<fpn/fw<-6.0$ (2), where fpn is the focal length of the plastic lens having negative refractive power, fpp is the focal length of the plastic lens having positive refractive power, and fw is the focal length of the entire system of the variable magnification optical system at a wide angle end.

9 Claims, 13 Drawing Sheets

EXAMPLE 1

EXAMPLE 1
WIDE

TELE

EXAMPLE 2

WIDE

TELE

FIG.3A EXAMPLE 3
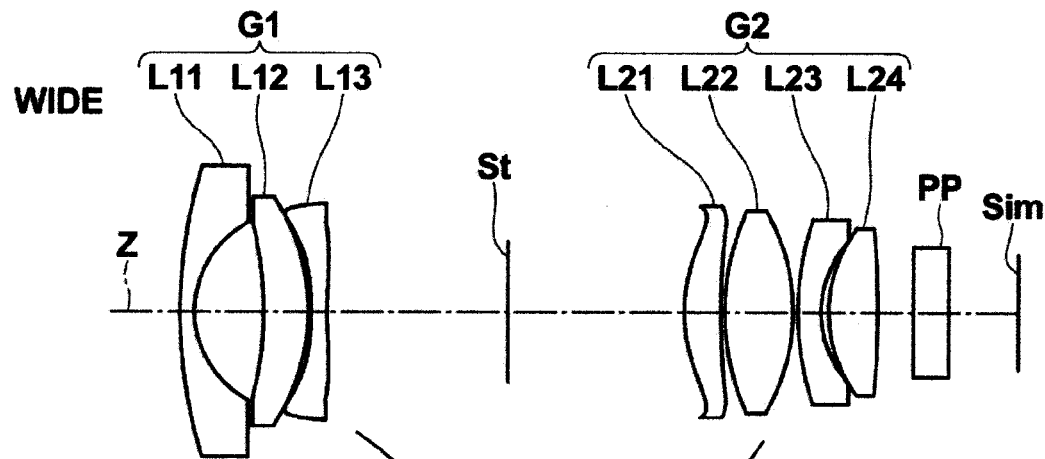
FIG.3B
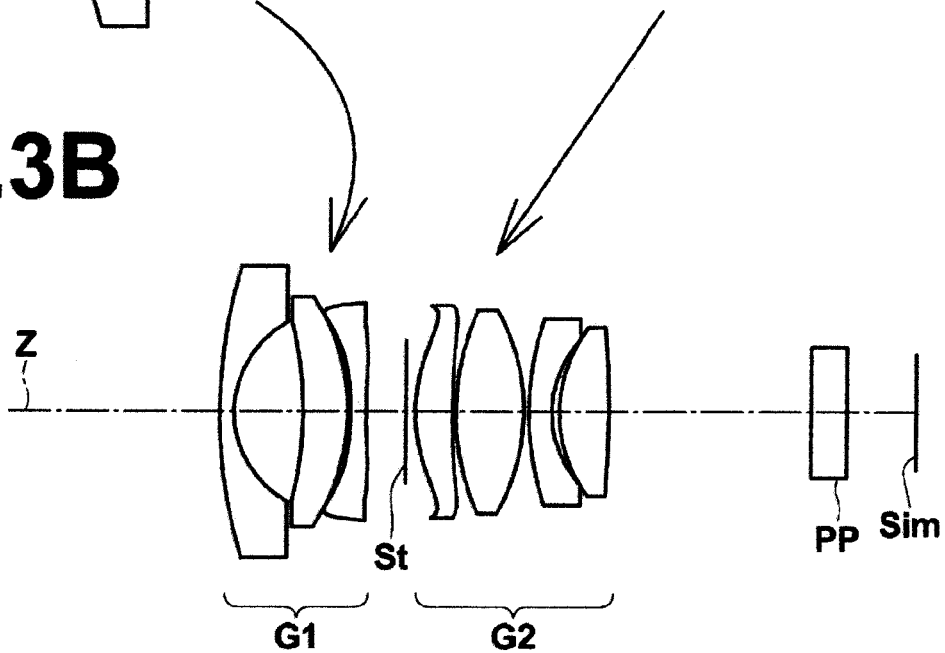

EXAMPLE 4

EXAMPLE 5

WIDE

TELE

EXAMPLE 6

WIDE

TELE

EXAMPLE 1

EXAMPLE 2

EXAMPLE 3

EXAMPLE 4
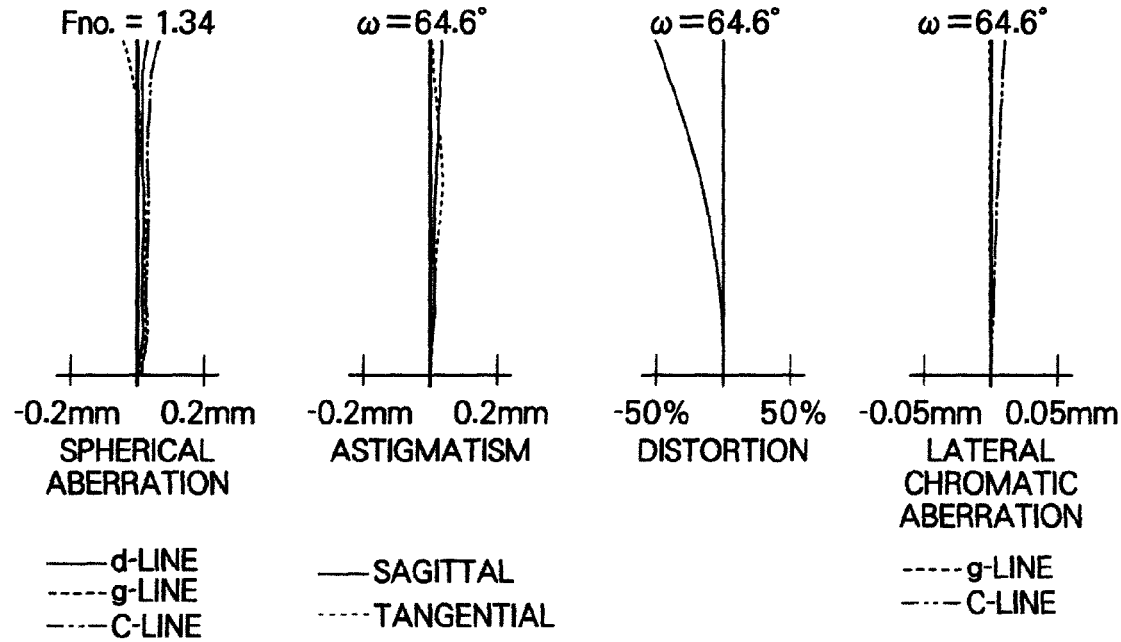
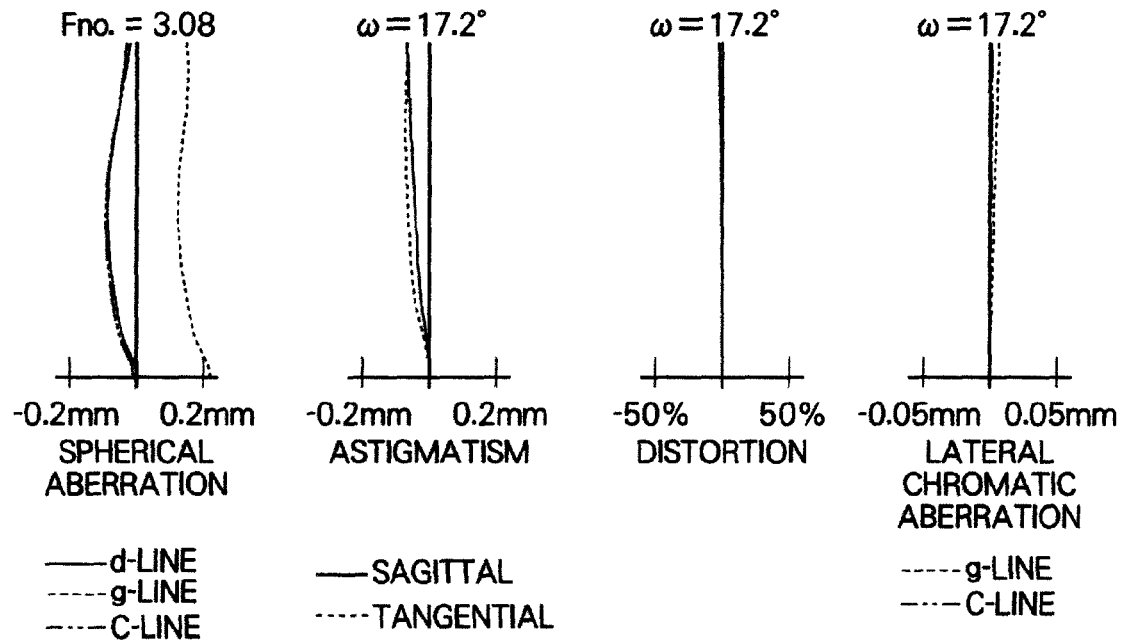

EXAMPLE 5

EXAMPLE 6

VARIABLE MAGNIFICATION OPTICAL SYSTEM AND IMAGING APPARATUS

BACKGROUND OF THE INVENTION

1. Field of the Invention

The present invention relates to a variable magnification optical system and an imaging apparatus. In particular, the present invention relates to a variable magnification optical system mountable in a video camera, an electronic still camera, and the like, and which is especially appropriate for use in a monitor or surveillance camera. Further, the present invention relates to an imaging apparatus including the variable magnification optical system.

2. Description of the Related Art

Conventionally, monitor cameras (surveillance cameras) were used to prevent crimes, to record images, and the like. Optical systems for the monitor cameras need to be small and producible at low cost. Further, the optical systems need to have large relative aperture, as well as high optical performance, so that subjects are identifiable even if photography is performed in low-illumination conditions. As a demand for monitor cameras with variable magnification functions increased in recent years, variable magnification optical systems are becoming the main trend of optical systems for monitor cameras.

Conventionally, zoom lenses for cameras were disclosed, for example, in Japanese Patent No. 2901066 (Patent Document 1) and U.S. Pat. No. 5,054,897 (Patent Document 2). Patent Document 1 discloses a zoom lens composed of a positive first lens group and a negative second lens group, which are arranged in this order from the object side of the zoom lens. Further, at least three of five lenses constituting the entire system of the zoom lens are made of plastic. Further, Patent Document 2 discloses a zoom lens composed of a negative first lens group and a positive second lens group, which are arranged in this order from the object side of the zoom lens. Further, a positive plastic lens and a negative plastic lens are arranged in the second lens group, or in each of the first lens group and the second lens group.

Conventionally, variable magnification optical systems for monitor cameras were proposed, for example, in Japanese Unexamined Patent Publication No. 2006-119574 (Patent Document 3), Japanese Unexamined Patent Publication No. 2008-310035 (Patent Document 4), and Japanese Unexamined Patent Publication No. 2008-310133 (Patent Document 5). Patent Document 3 discloses a variable magnification optical system composed of a negative first lens group, a stop, and a positive second lens group, which are arranged in this order from the object side of the variable magnification optical system. The magnification of the variable magnification optical system is changeable from a wide angle end to a telephoto end by moving the second lens group, on the optical axis, toward the object side. Further, a most-object-side lens in the second lens group is an aspheric lens. Further, Patent Document 4 discloses a variable magnification optical system composed of a negative first lens group, a stop and a positive second lens group, which are arranged in this order from the object side of the variable magnification optical system. When the magnification of the variable magnification optical system is changed from a wide angle end to a telephoto end, the first lens group and the second lens group move in such a manner that a distance therebetween decreases. Further, a most-image-side lens in the second lens group is a plastic lens. Further, Patent Document 5 discloses a variable magnification optical system composed of a negative first lens group, a stop, and a positive second lens group, which are arranged in this order from the object side of the variable magnification optical system. When the magnification of the variable magnification optical system is changed from a wide angle end to a telephoto end, the first lens group and the second lens group move in such a manner that a distance therebetween decreases. Further, at least one positive plastic lens and at least one negative plastic lens are arranged in the second lens group.

Currently, main trends of lenses for monitor cameras are high-performance lenses with wide angles and large relative apertures. Further, reduction in cost was strongly requested in recent years. One of methods for reducing the cost is use of plastic lenses. Meanwhile, the optical systems disclosed in Patent Documents 1 and 2 use many plastic lenses. However, they have problems, such as large F-numbers and small angles of view. In the optical system disclosed in Patent Document 3, all lenses are glass lenses. Especially because an aspheric lens made of glass is used, the cost for producing the optical system is high. The optical systems disclosed in Patent Documents 4 and 5 use plastic lenses, and the plastic lenses are arranged on the most image side of the optical systems. When rays of light pass through a most-image-side lens, the diameter of the rays of light is relatively small. Since dust tends to adhere to a plastic lens by static electricity more than to a glass lens, there is a problem that such adhesion of dust onto a surface of the plastic lens on the optical path of the optical system largely affects an image formed by the optical system.

Meanwhile, the advantages of a plastic lens over a glass lens are lower cost, lighter weight, and higher flexibility in shape (highly flexible designing). However, the plastic lens has disadvantages that the refractive index and the volume of the plastic lens greatly change by a fluctuation of temperature. Therefore, adoption of the plastic lens in a lens for an outdoor surveillance camera has been regarded as difficult, because a fluctuation of temperature is large outdoors.

SUMMARY OF THE INVENTION

In view of the foregoing circumstances, it is an object of the present invention to provide a variable magnification optical system that can suppress a deterioration in performance caused by a fluctuation of, temperature, and which is producible at low cost while a small size, a wide angle, a large relative aperture, and high performance are maintained. Further, it is another object of the present invention to provide an imaging apparatus including the variable magnification optical system.

A variable magnification optical system of the present invention is a variable magnification optical system comprising:

a first lens group having negative refractive power;

a stop; and a second lens group having positive refractive power, which are arranged from the object side of the variable magnification optical system in the order mentioned above, wherein the magnification of the variable magnification optical system is changed by changing a distance between the first lens group and the second lens group in the direction of an optical axis, and wherein the first lens group includes a plastic lens having negative refractive power, and wherein the second lens group includes a plastic lens having positive refractive power, and wherein the following formulas (1) and (2) are satisfied:

$$5.0 < fpp/fw < 7.5 \quad (1); \text{ and}$$

$$-7.0 < fpn/fw < -6.0 \quad (2), \text{ where}$$

fpn is the focal length of the plastic lens having negative refractive power, fpp is the focal length of the plastic lens having positive refractive power, and fw is the focal length of the entire system of the variable magnification optical system at a wide angle end.

When a plastic lens is used to lower the cost of an optical system, one of methods for suppressing a change in performance of the optical system caused by the plastic lens during fluctuation of temperature is to lower the refractive power of the plastic lens. However, in this method, it is difficult to realize an optical system that has a small size, a wide angle, a large relative aperture and high performance, and which the present invention aims at. Therefore, in the variable magnification optical system of the present invention, both of a plastic lens having positive refractive power and a plastic lens having negative refractive power are provided so that the influences of a fluctuation of temperature are offset. Consequently, it is not necessary to lower the refractive power of the plastic lenses, and the flexibility in designing becomes higher. Further, excellent correction of aberrations is possible by using a small number of lenses. In the variable magnification optical system of the present invention, the range of the refractive power of each of a positive plastic lens and a negative plastic lens is set in an appropriate manner. Therefore, high optical performance is achievable while a small size, a wide angle and a large relative aperture are maintained.

In the variable magnification optical system of the present invention, the first lens group may be composed three lenses of a negative lens, a positive lens and a negative lens, which are arranged from the object side in the order mentioned above.

In the variable magnification optical system of the present invention, the second lens group may be composed of four lenses.

In the variable magnification optical system of the present invention, it is desirable that the plastic lens having positive refractive power in the second lens group is arranged on the most object side in the second lens group. Further, it is desirable that the following formula (3) is satisfied:

$$52.0 < vdpp < 58.0 \quad (3), \text{ where}$$

vdpp is the Abbe number of the material of the plastic lens having positive refractive power with respect to d-line.

In the variable magnification optical system of the present invention, it is desirable that the plastic lens having negative refractive power in the first lens group is arranged on the most image side in the first lens group. Further, it is desirable that the following formula (4) is satisfied:

$$vdpn > 54.0 \quad (4), \text{ where}$$

vdpn is the Abbe number of the material of the plastic lens having negative refractive power with respect to d-line.

In the variable magnification optical system of the present invention, it is desirable that each of the plastic lens having positive refractive power in the second lens group and the plastic lens having negative refractive power in the first lens group has at least one aspheric surface.

In the variable magnification optical system of the present invention, it is desirable that when the magnification of the variable magnification optical system is changed from a wide angle end to a telephoto end, the first lens group moves from the image side of the variable magnification optical system to the object side of the variable magnification optical system after moving from the object side to the image side. Here, the term "moves" and the term "moving" refer to movement of the lens group with respect to an image plane.

In the variable magnification optical system of the present invention, it is desirable that a most-object-side lens and a most-image-side lens in the entire system of the variable magnification optical system are made of material other than plastic.

The sign (positive/negative) of the refractive power of a lens represents a refractive power in a paraxial region of the lens when the lens is an aspheric lens. Further, the focal lengths in the formulas (1) and (2) are focal lengths in paraxial regions.

In the above descriptions, the number of lenses is the number of composition elements of lenses. For example, when plural single lenses made of different materials from each other are cemented together to form a cemented lens, the number of the single lenses constituting the cemented lens is the number of lenses of the cemented lens.

An imaging apparatus according to the present invention includes a variable magnification optical system of the present invention.

A variable magnification optical system of the present invention is composed of a negative first lens group, a stop, and a positive second lens group, which are arranged from the object side of the variable magnification optical system in the order mentioned above. The magnification of the variable magnification optical system is changed by changing a distance between the first lens group and the second lens group in the direction of an optical axis. Further, the first lens group includes a negative plastic lens, and the second lens group includes a positive plastic lens. Further, the refractive power of the negative plastic lens and the refractive power of the positive plastic lens are appropriately set. Therefore, the variable magnification optical system of the present invention can suppress a deterioration in performance caused by a fluctuation of temperature. Further, low-cost production is achievable, while a small size, a wide angle, a large relative aperture and high performance are maintained.

An imaging apparatus of the present invention includes a variable magnification optical system of the present invention. Therefore, the imaging apparatus is small, and producible at low cost. Further, imaging with wide angle of view is possible, and high-quality images and video images are obtainable even in low-illumination large-temperature-fluctuation conditions.

BRIEF DESCRIPTION OF THE DRAWINGS

FIG. 3A is a cross section illustrating the lens structure of a variable magnification optical system in Example 3 of the present invention at a wide angle end;

FIG. 3B is a cross section illustrating the lens structure of the variable magnification optical system in Example 3 of the present invention at a telephoto end;

FIGS. 10A through 10H are diagrams illustrating aberrations of the variable magnification optical system in Example 4 of the present invention;

DESCRIPTION OF THE PREFERRED EMBODIMENTS

Figure 1A:
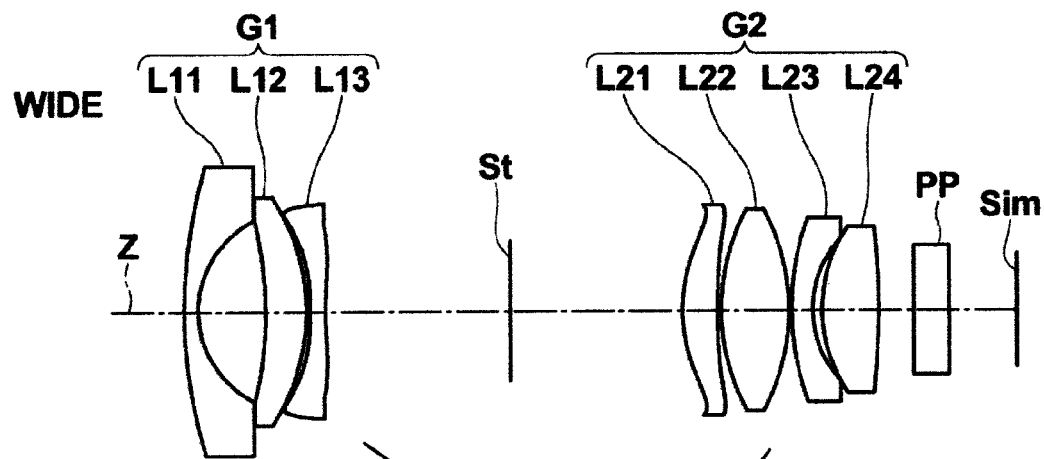
FIG. 1A is a cross section illustrating the lens structure of a variable magnification optical system in Example 1 of the present invention at a wide angle end.
Figure 1B:
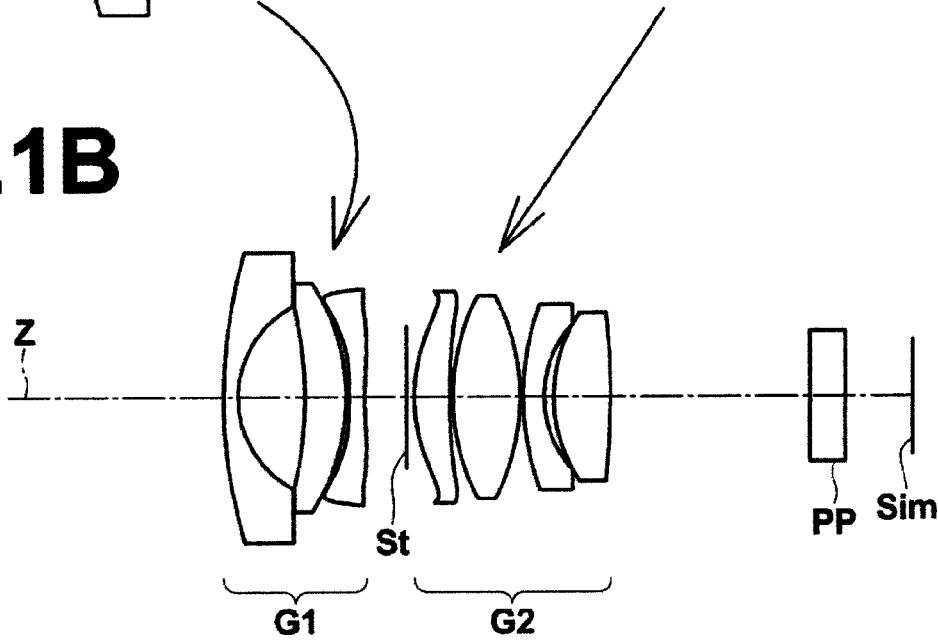
FIG. 1B is a cross section illustrating the lens structure of the variable magnification optical system in Example 1 of the present invention at a telephoto end.
Figure 2A:
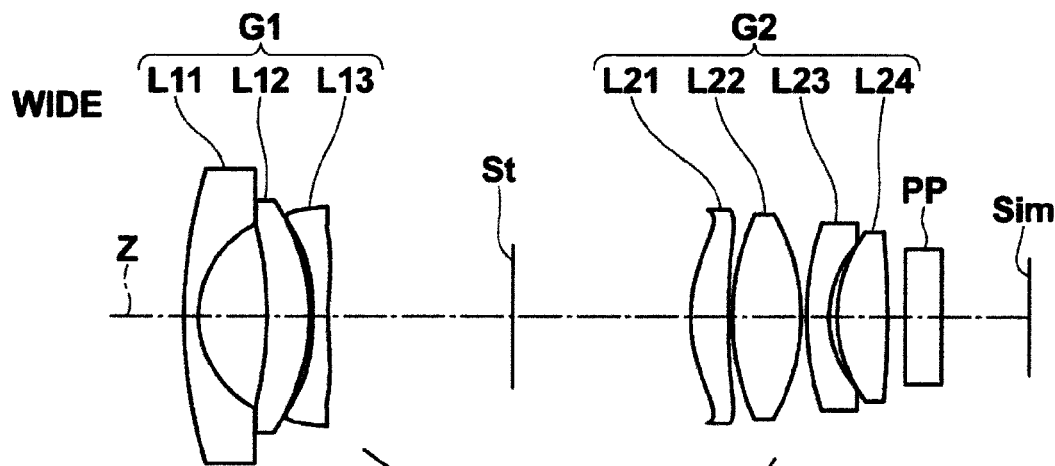
FIG. 2A is a cross section illustrating the lens structure of a variable magnification optical system in Example 2 of the present invention at a wide angle end.
Figure 2B:
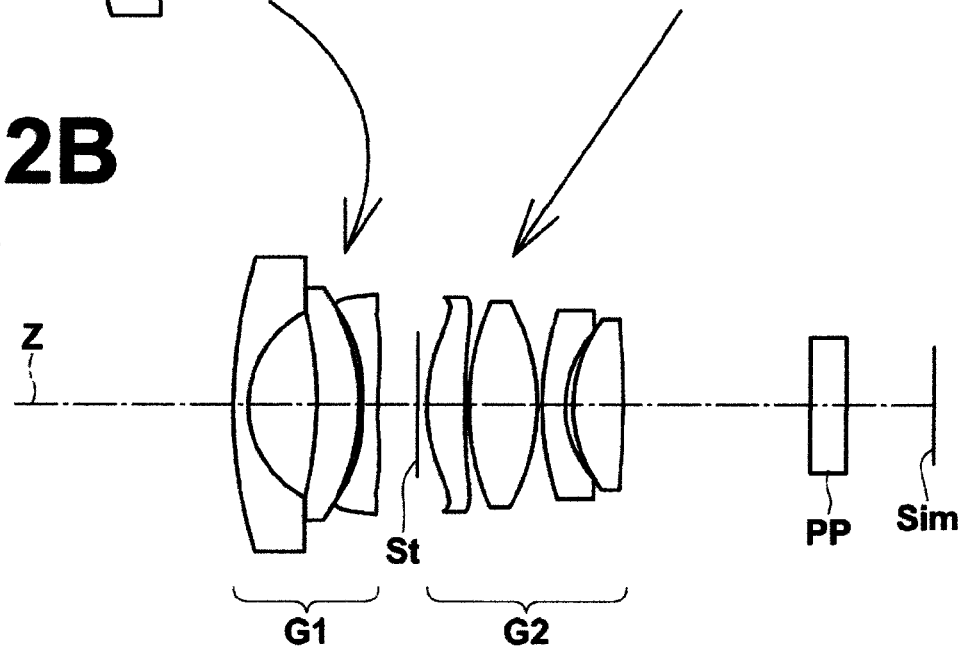
FIG. 2B is a cross section illustrating the lens structure of the variable magnification optical system in Example 2 of the present invention at a telephoto end.
Figure 4A:
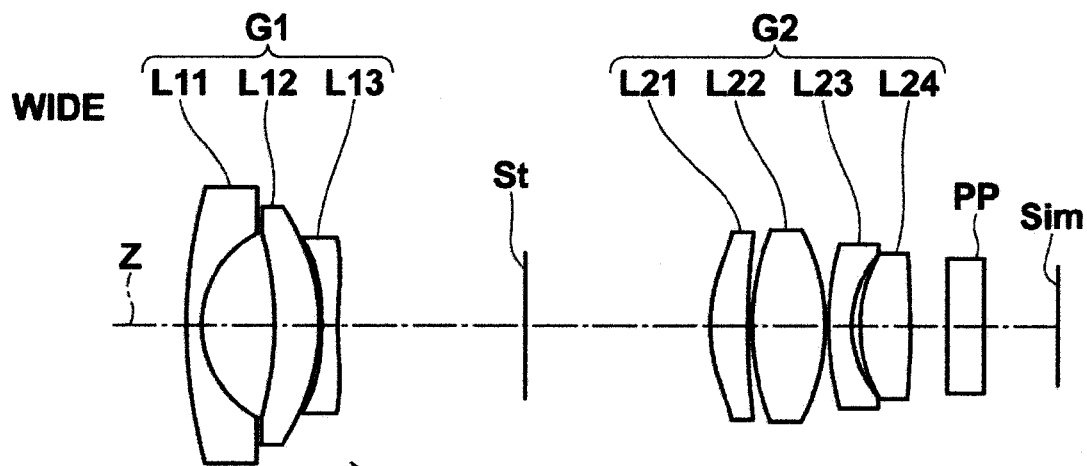
FIG. 4A is a cross section illustrating the lens structure of a variable magnification optical system in Example 4 of the present invention at a wide angle end.
Figure 4B:
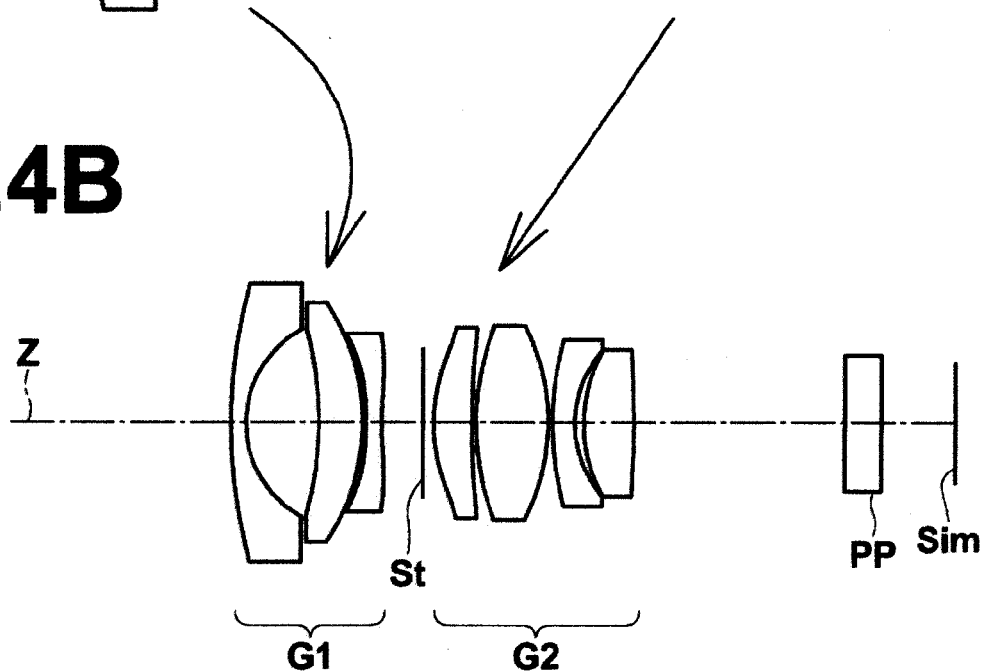
FIG. 4B is a cross section illustrating the lens structure of the variable magnification optical system in Example 4 of the present invention at a telephoto end.
Figure 5A:
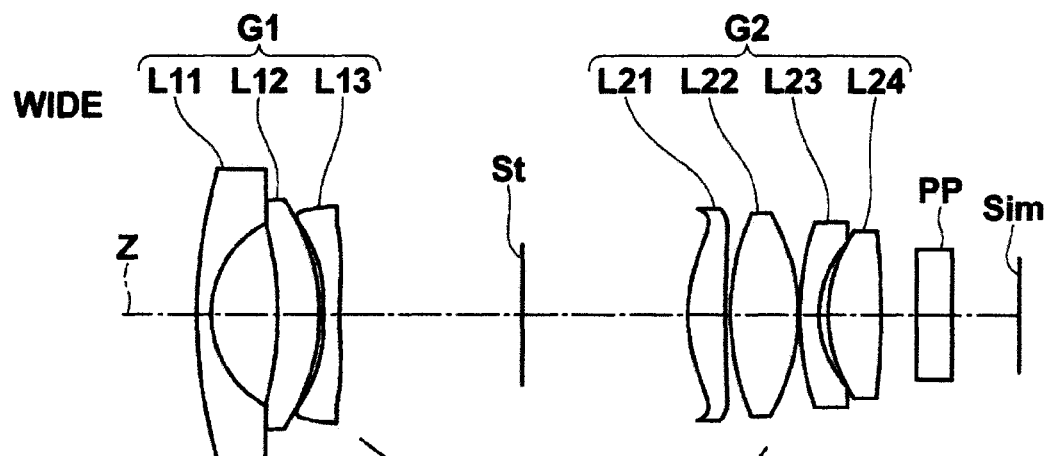
FIG. 5A is a cross section illustrating the lens structure of a variable magnification optical system in Example 5 of the present invention at a wide angle end.
Figure 5B:
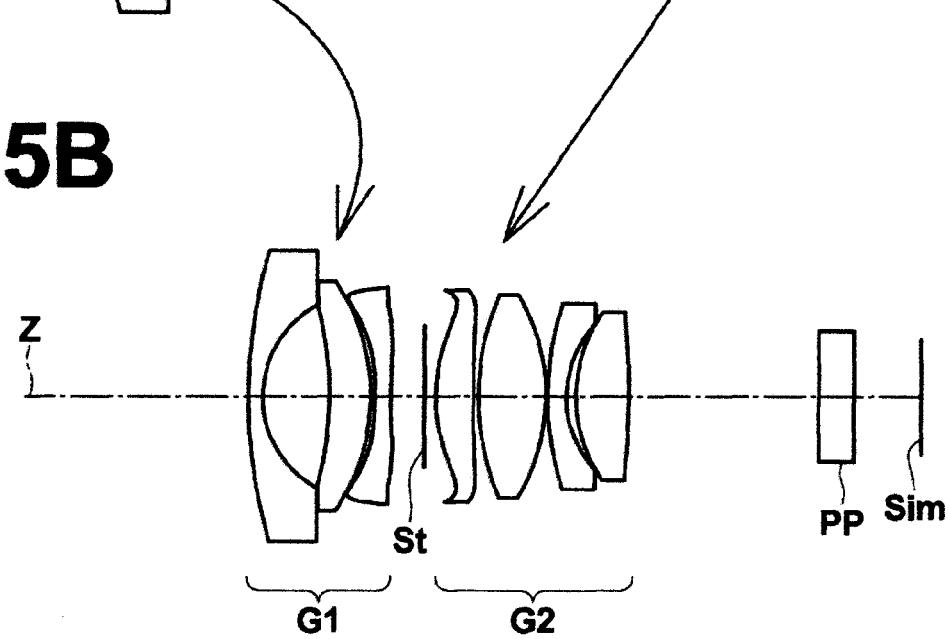
FIG. 5B is a cross section illustrating the lens structure of the variable magnification optical system in Example 5 of the present invention at a telephoto end.
Figure 6A:
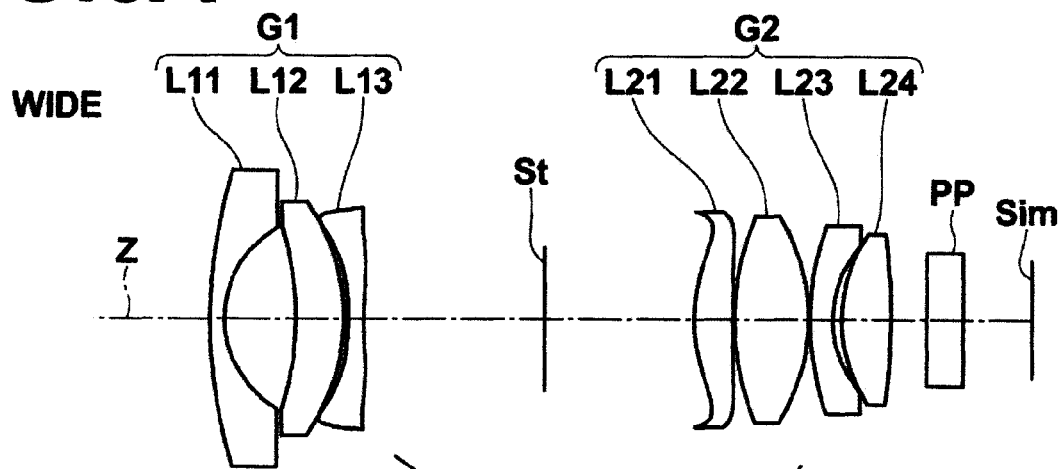
FIG. 6A is a cross section illustrating the lens structure of a variable magnification optical system in Example 6 of the present invention at a wide angle end.
Figure 6B:
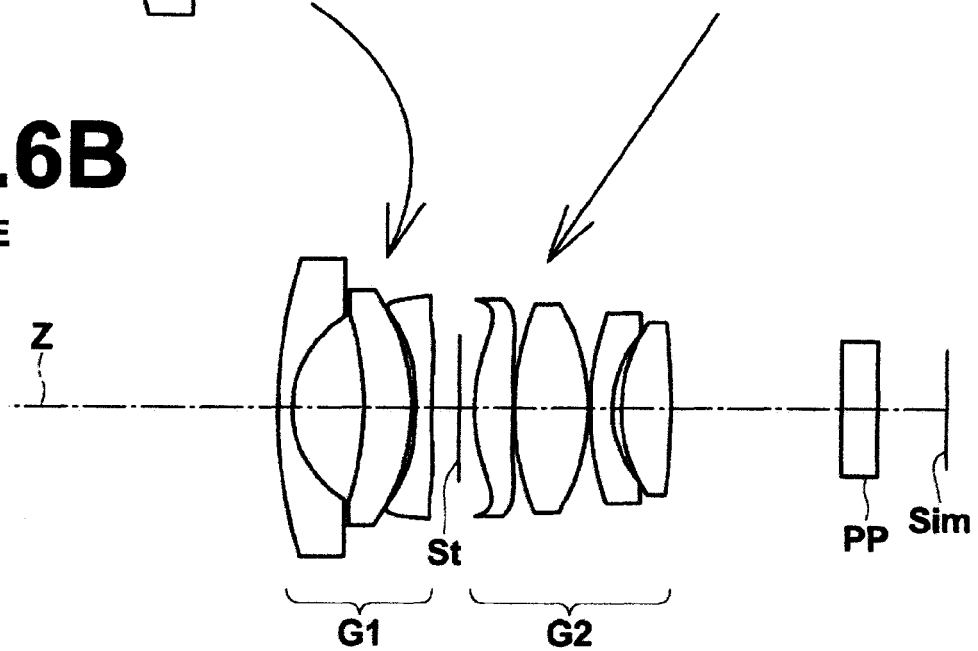
FIG. 6B is a cross section illustrating the lens structure of the variable magnification optical system in Example 6 of the present invention at a telephoto end.
Figures 7A, 7B, 7C, 7D:
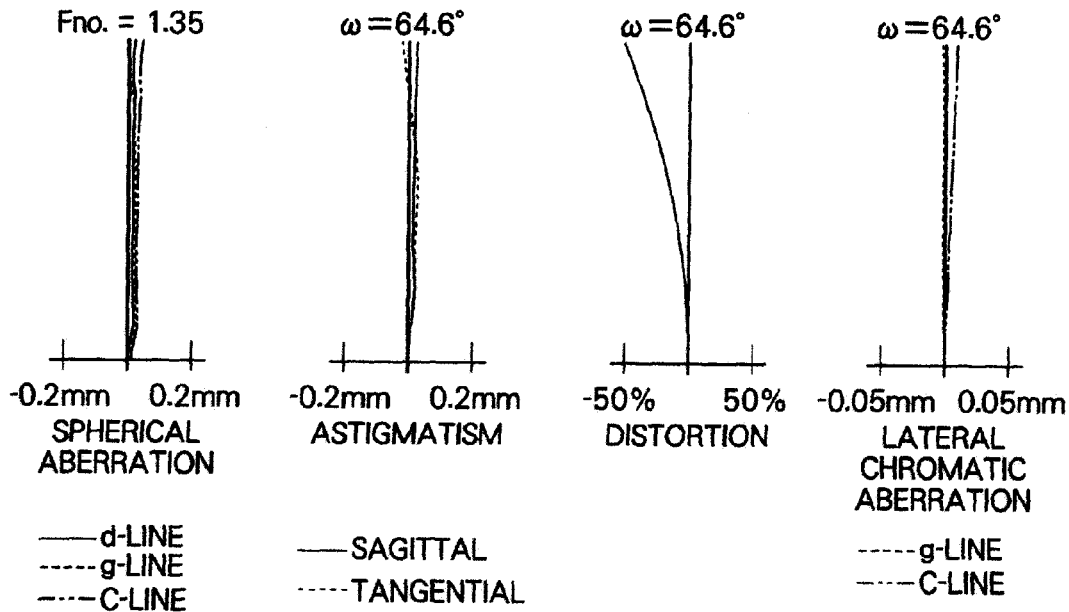
FIGS. 7A through 7H are diagrams illustrating aberrations of the variable magnification optical system in Example 1 of the present invention.
Figures 7E, 7F, 7G, 7H:
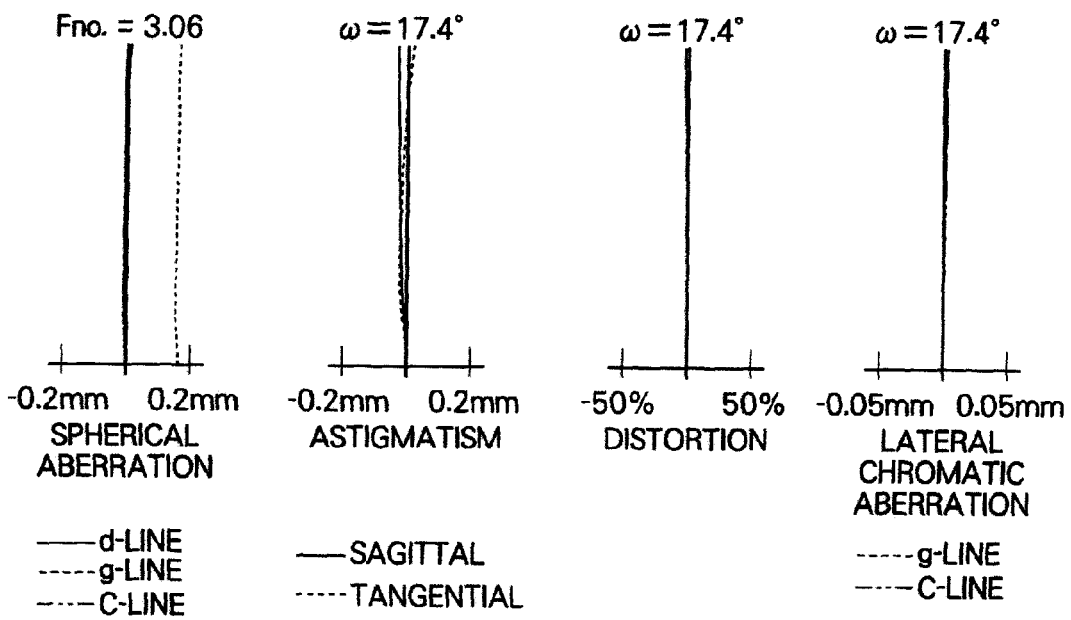
Figures 8A, 8B, 8C, 8D:
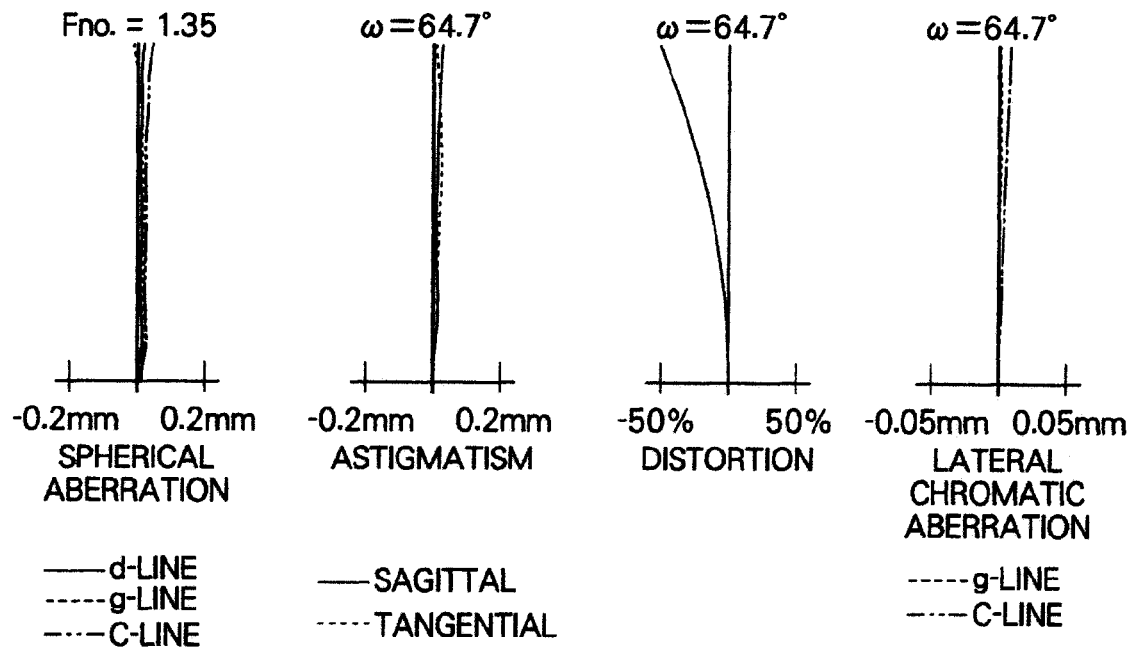
FIGS. 8A through 8H are diagrams illustrating aberrations of the variable magnification optical system in Example 2 of the present invention.
Figures 8E, 8F, 8G, 8H:
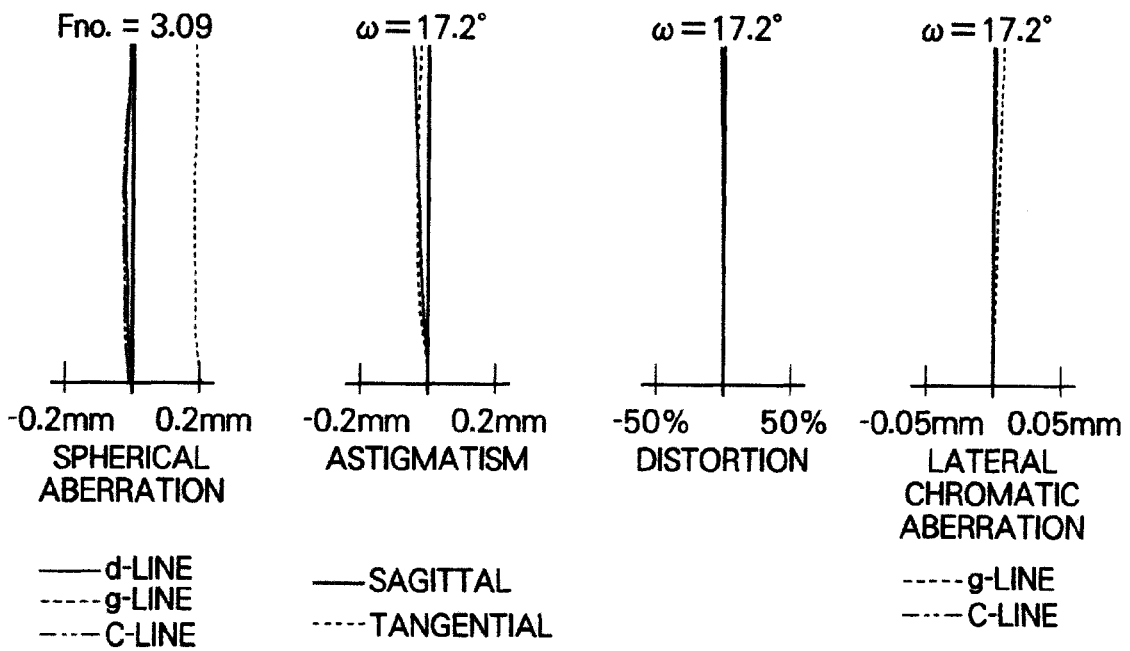
Figures 9A, 9B, 9C, 9D:
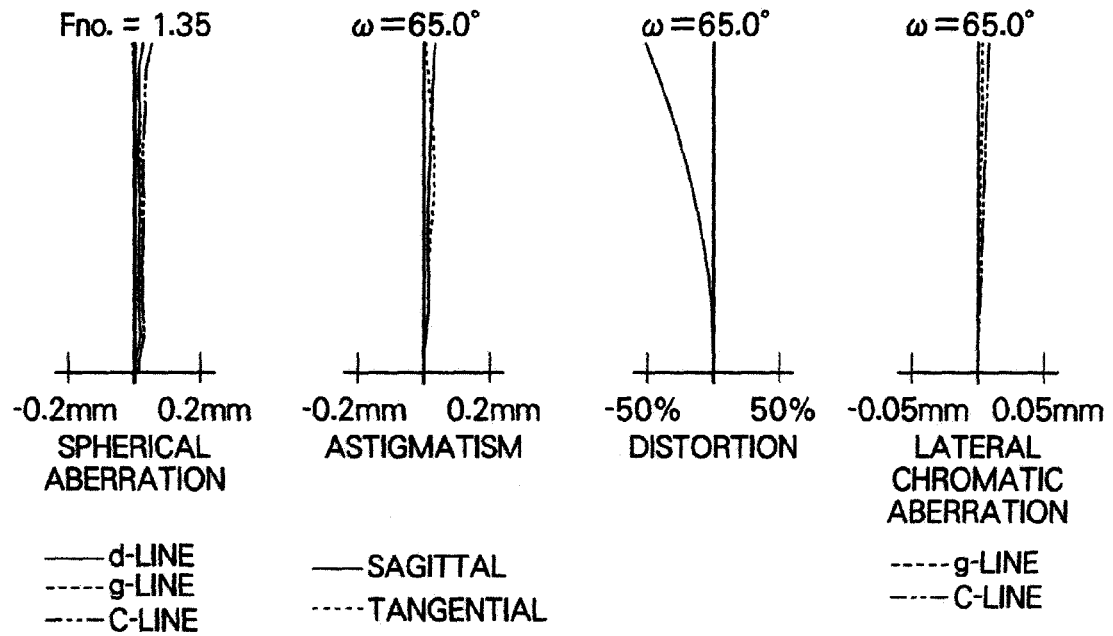
FIGS. 9A through 9H are diagrams illustrating aberrations of the variable magnification optical system in Example 3 of the present invention.
Figures 9E, 9F, 9G, 9H:
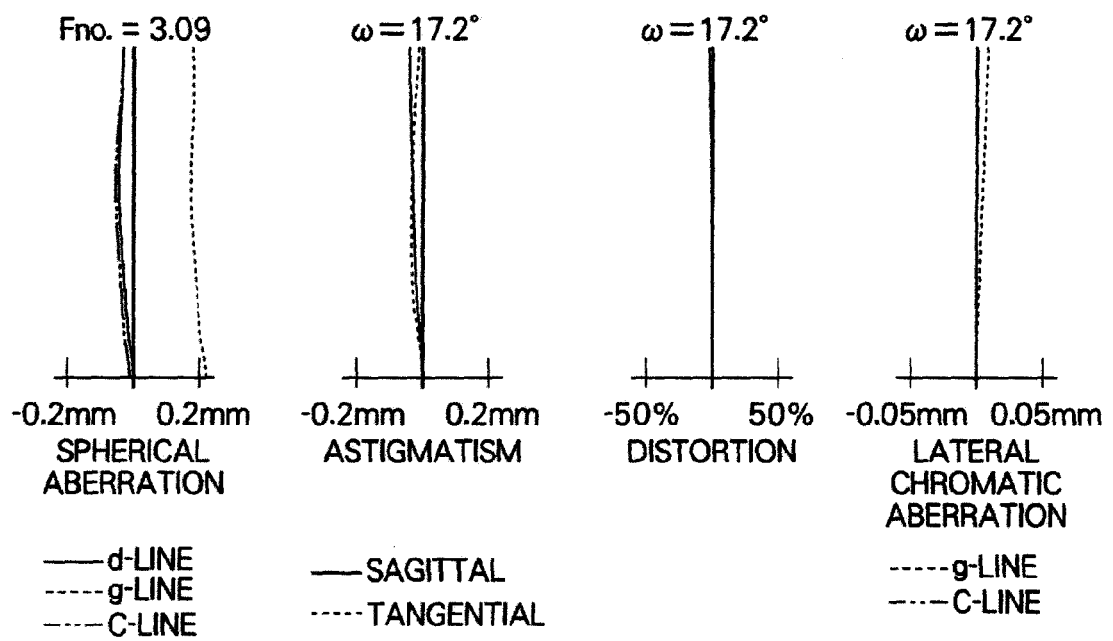
Figures 11A, 11B, 11C, 11D:
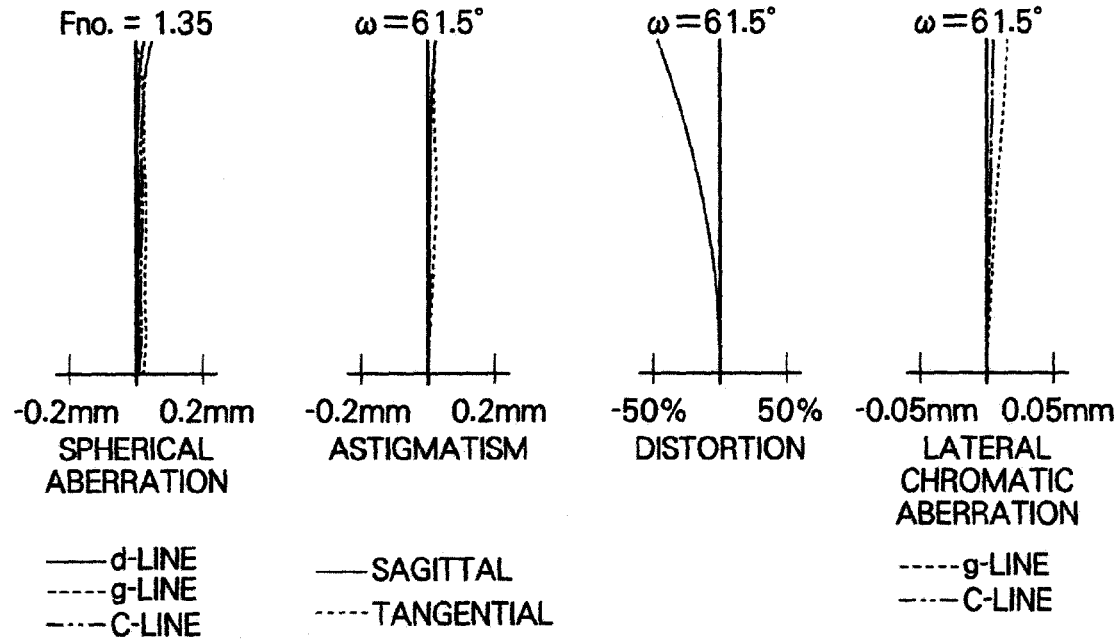
FIGS. 11A through 11H are diagrams illustrating aberrations of the variable magnification optical system in Example 5 of the present invention.
Figures 11E, 11F, 11G, 11H:
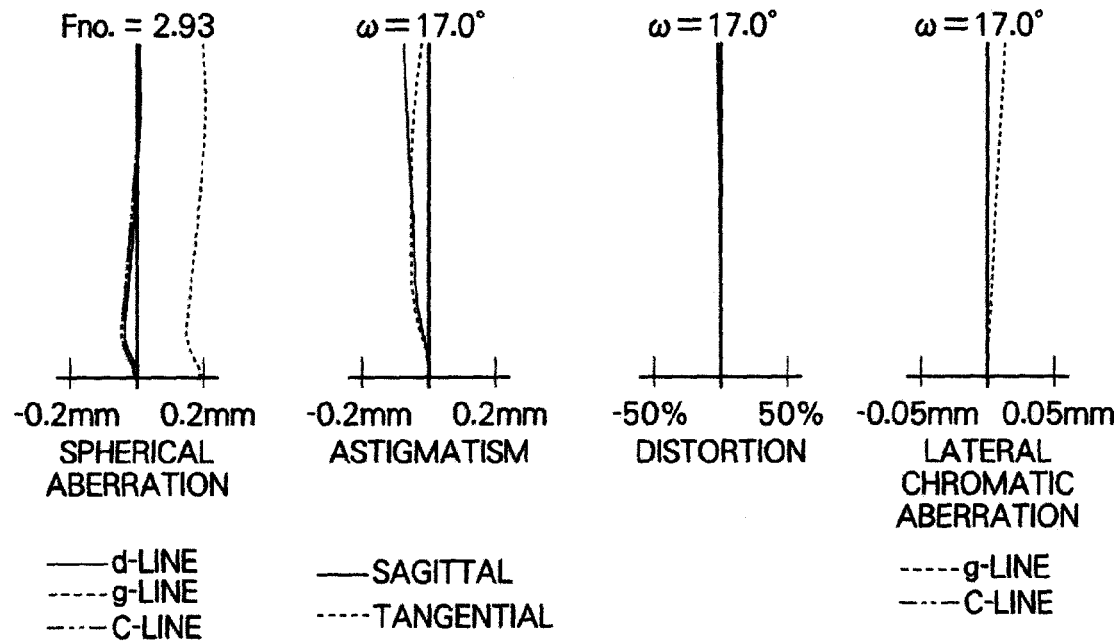
Figures 12A, 12B, 12C, 12D:
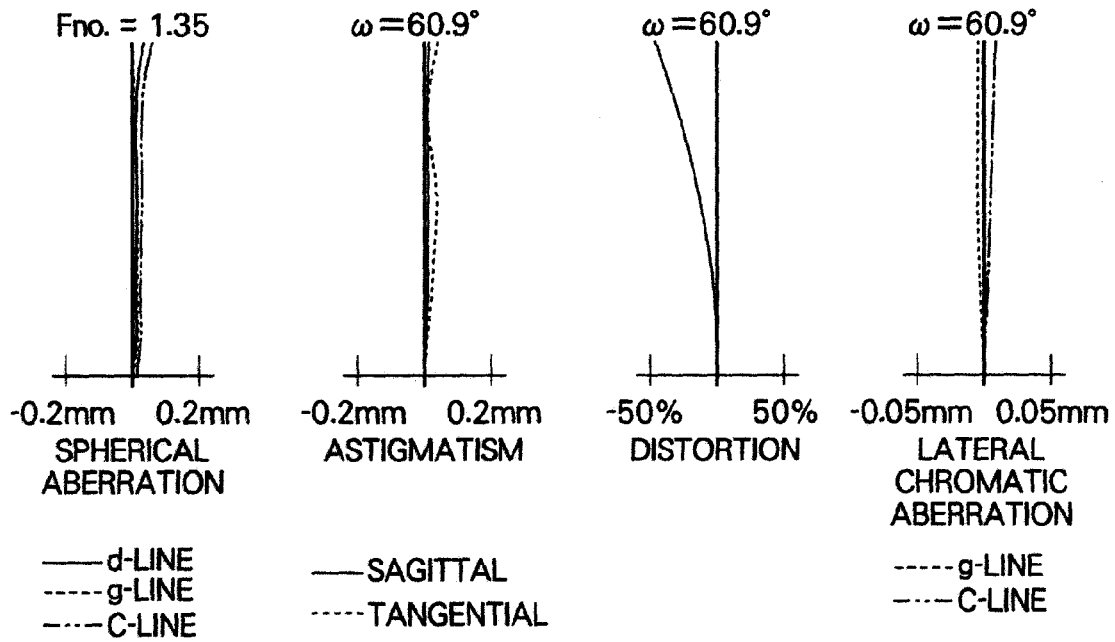
FIGS. 12A through 12H are diagrams illustrating aberrations of the variable magnification optical system in Example 6 of the present invention.
Figures 12E, 12F, 12G, 12H:
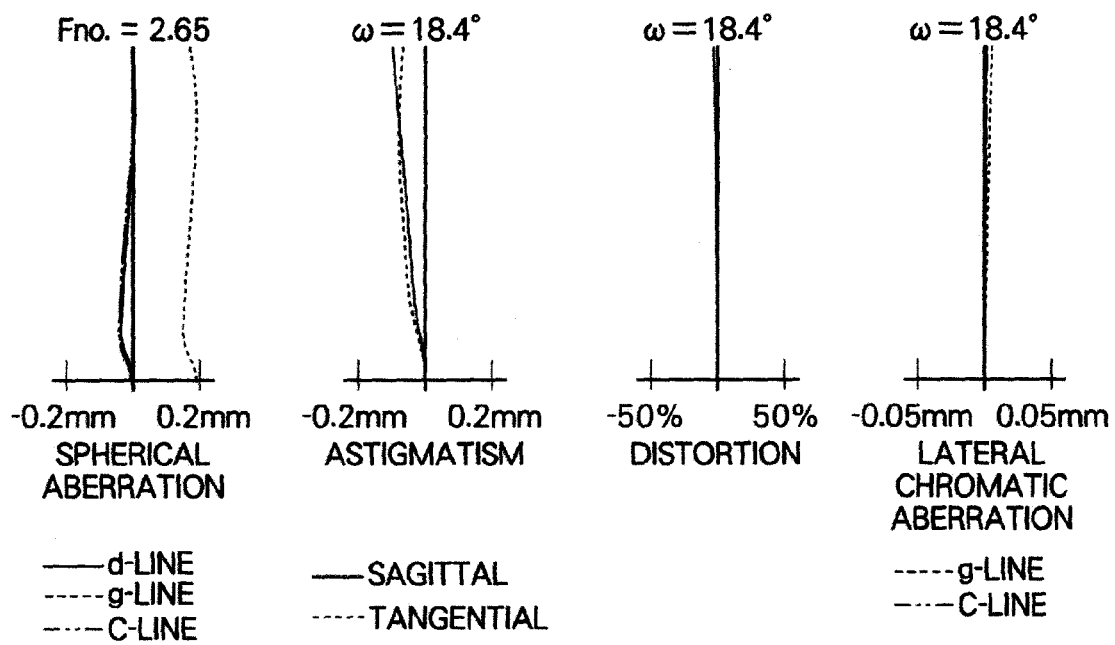

Hereinafter, embodiments of the present invention will be described in detail with reference to drawings. FIGS. 1A and 1B are cross sections illustrating an example of the structure of a variable magnification optical system according to an embodiment of the present invention. FIGS. 1A and 1B correspond to a variable magnification optical system in Example 1, which will be described later. In FIGS. 1A and 1B, the left side is the object side of the variable magnification optical system, and the right side is the image side of the variable magnification optical system. FIG. 1A illustrates the arrangement of lenses at a wide angle end when the variable magnification optical system is focused at infinity. FIG. 1B illustrates the arrangement of lenses at a telephoto end when the variable magnification optical system is focused at infinity.

A variable magnification optical system according to an embodiment of the present invention is composed of first lens group G1 having negative refractive power, aperture stop St, and second lens group G2 having positive refractive power, which are arranged along optical axis Z from the object side of the variable magnification optical system in the order mentioned above. The magnification of the variable magnification optical system is changed by changing a distance between the first lens group G1 and the second lens group G2 in the direction of the optical axis Z. The structure of the variable magnification optical system in which the most-object-side lens group has negative power is advantageous to achievement of a wide angle, and a back focus is relatively easily secured. In FIGS. 1A and 1B, the aperture stop St does not necessarily represent the size nor the shape of the aperture stop, but the position of the aperture stop St on optical axis Z.

When the variable magnification optical system is applied to an imaging apparatus, it is desirable that a cover glass, a prism, various filters, such as an infrared-ray-cut filter and a low-pass filter, or the like is arranged between the variable magnification optical system and image plane Sim based on the structure of a camera on which the variable magnification optical system is mounted. FIGS. 1A and 1B illustrate a case in which parallel-flat-plate-shaped optical member PP, assuming these elements, is arranged between the second lens group G2 and the image plane Sim.

Arrows between FIGS. 1A and 1B schematically illustrate the path of movement of each lens group when the magnification of the variable magnification optical system is changed from a wide angle end to a telephoto end. As illustrated in FIGS. 1A and 1B, when the magnification of the variable magnification optical system is changed from a wide angle end to a telephoto end, if the first lens group G1 moves from the image side of the variable magnification optical system to the object side of the variable magnification optical system after moving from the object side to the image side, it is possible to reduce the length of the entire system of the variable magnification optical system in the direction of the optical axis, even when the length of the variable magnification optical system in changing magnification is considered. Further, it is possible to make the entire optical system compact.

When the compactness and the performance of the variable magnification optical system are considered, it is desirable that the first lens group G1 is composed of at least three lenses. When the first lens group G1 is composed of three lenses, it is desirable that the first lens group G1 is composed of two negative lenses and a positive lens. In the example illustrated in FIG. 1A, negative lens L11, positive lens L12 and negative lens L13 are arranged in the first lens group G1 in this order from the object side. Specifically, for example, the first lens group G1 may be composed of a negative meniscus lens having a convex surface facing the object side, a positive meniscus lens having a concave surface facing the object side, and a double concave lens, which are arranged in this order from the object side.

The first lens group G1 of the variable magnification optical system according to an embodiment of the present invention includes a plastic lens having negative refractive power. When the first lens group G1 is composed three lenses of two negative lenses and a positive lens, and one of the negative lenses is a plastic lens, it is desirable that the power of the lenses is arranged as illustrated in FIG. 1A. Specifically, it is desirable that a negative lens, a positive lens, and a negative lens are arranged in this order from the object side. The reason why such arrangement is desirable will be described below.

It is desirable that a negative lens is arranged on the most object side to increase the angle of view of an optical system. Further, it is desirable that a most-object-side lens is a glass lens, which is resistant to various environmental conditions. Therefore, a negative plastic lens in the first lens group G1 should be arranged at the second position or the third position in the first lens group G1 from the object side. Further, the outer edge of a plastic lens ordinarily has a flange portion for the convenience of formation of the plastic lens. Therefore, when the plastic lens is arranged in an optical system, the plastic lens needs a space for the flange portion, which is not needed by a glass lens.

If the first lens group G1 is composed of a negative first lens, a negative second lens, and a positive third lens, which are arranged in this order from the object side, and the negative second lens is a plastic lens, it is necessary to maintain a space between the negative second lens and the negative first lens and a space between the negative second lens and the positive third lens for the flange portion. These spaces make correction of spherical aberrations and correction of curvature of field difficult. Further, it becomes difficult to achieve a large relative aperture and high optical performance.

In contrast, if the first lens group G1 is composed of a negative first lens, a positive second lens, and a negative third lens, which are arranged in this order from the object side, and the negative third lens is a plastic lens, only a distance between the negative third lens and the positive second lens needs to be considered. Therefore, correction of aberrations is easier, and the length of the first lens group G1 in the direction of the optical axis is short. Therefore, it is desirable that the negative plastic lens is the third lens in the first lens group G1, in other words, it is desirable that the negative plastic lens is arranged on the most image side in the first lens group G1.

It is desirable that the second lens group G2 is composed of four lenses. As illustrated in FIG. 1A, the four lenses may be positive lens L21, positive lens L22, negative lens L23, and positive lens L24, which are arranged in this order from the object side. Specifically, for example, the second lens group G2 may be composed of a positive meniscus lens having a convex surface facing the object side, a double-convex lens, a negative meniscus lens having a convex surface facing the object side, and a double-convex lens, which are arranged in this order from the object side. Further, the sign of the refractive power and the shape of each lens in the first lens group G1 and the second lens group G2 are the refractive power and the shape in a paraxial region when the lens is an aspheric lens.

Further, the second lens group G2 includes a plastic lens having positive refractive power. In the variable magnification optical system according to an embodiment of the present invention, the first lens group G1 has a negative plastic lens, and the second lens group G2 has a positive plastic lens.

A plastic lens is producible at lower cost than a glass lens, and the flexibility in the shape or design is higher. However, a change in performance of a plastic lens due to a fluctuation of temperature is larger than a glass lens. Among changes in performance of the plastic lens, a change in refractive power is prominent. Therefore, in the variable magnification optical system of the present invention, both of a plastic lens having positive refractive power and a plastic lens having negative refractive power are used. The influence of the positive plastic lens and the influence of the negative plastic lens are offset when temperature fluctuates. Consequently, it is possible to suppress a change in the performance of the entire system.

Production of plastic lenses has more unstable factors than production of glass lenses. Therefore, when plural plastic lenses are arranged in a lens group, if a trouble such as a failure in desirable optical performance occurs, it needs long time and work to identify the cause of the trouble. Consequently, the cost of production increases in some cases. If the plural plastic lenses are distributed to the first lens group G1 and the second lens group G2, it is possible to prevent such a risk in production, and that is cost advantageous.

When a plastic lens having negative refractive power and a plastic lens having positive refractive power are distributed to different lens groups, it is desirable that the plastic lens having negative refractive power is arranged in a lens group having negative refractive power, and that the plastic lens having positive refractive power is arranged in a lens group having positive refractive power. The number of a positive lens or lenses in a negative lens group, and the number of a negative lens or lenses in a positive lens group are small in the respective lens groups. Further, the positive lens or lenses in the negative lens group and the negative lens or lenses in the positive lens group play important roles in the respective lens groups in many cases. Therefore, if such lenses, i.e., a positive lens in a negative lens group and a negative lens in a positive lens group are plastic lenses, a fluctuation of temperature may largely influence.

Further, it is desirable that at least one of an object-side surface and an image-side surface of the plastic lens having negative refractive power in the first lens group G1 is aspheric. Further, it is desirable that at least one of an object-side surface and an image-side surface of the plastic lens having positive refractive power in the second lens group G2 is aspheric. The aspheric surfaces of these lenses are advantageous to correction of aberrations. Further, these plastic lenses having aspheric surfaces are producible at lower cost, compared with glass lenses having aspheric surfaces.

It is desirable that the plastic lens having negative refractive power in the first lens group G1 is arranged on the most image side in the first lens group G1. Further, It is desirable that the plastic lens having positive refractive power in the second lens group G2 is arranged on the most object side in the second lens group G2. Even if the negative plastic lens and the positive plastic lens are distributed to two different lens groups as in the variable magnification optical system of the present invention, if the negative plastic lens is arranged on the most image side in the first lens group G1 and the positive plastic lens is arranged on the most object side in the second lens group G2, a difference in temperature between the two lenses can be kept small when a temperature gradient is created in the direction of the optical axis of the optical system, compared with a case in which these lenses are not arranged in such a manner.

Arrangement of the negative plastic lens on the most image side in the first lens group G1 and formation of at least one aspheric surface on the negative plastic lens are advantageous to correction of curvature of field. Further, arrangement of the positive plastic lens on the most object side in the second lens group G2 and formation of at least one aspheric surface on the positive plastic lens make correction of spherical aberration easy. Further, a large relative aperture is easily achievable. When the plastic lenses are used in this manner and aspheric surfaces are arranged effectively, it is possible to achieve a small size, a wide angle, a large relative aperture, and high optical performance, while reducing the cost of production.

Further, in the variable magnification optical system according to an embodiment of the present invention, a desirable range of the refractive power of each plastic lens is regulated to obtain a high-performance optical system. The variable magnification optical system of the present invention is structured so as to satisfy the following formulas (1) and (2):

$$5.0 < fpp/fw < 7.5 \qquad (1); \text{ and}$$

$$-7.0 < fpn/fw < -6.0 \qquad (2),$$

when fpn is the focal length of the plastic lens having negative refractive power in the first lens group G1, and fpp is the focal length of the plastic lens having positive refractive power in the second lens group G2, and fw is the focal length of the entire system of the variable magnification optical system at a wide angle end.

When the value of fpp/fw is lower than the lower limit defined by the formula (1), spherical aberration and curvature of field are excessively corrected at a wide angle end. Further, spherical aberration and curvature of field are insufficiently corrected at a telephoto end. When the value of fpp/fw exceeds the upper limit defined by the formula (1), the magnitudes of spherical aberration, longitudinal chromatic aberration, and lateral chromatic aberration at a wide angle end become unignorable. Further, lateral chromatic aberration at a telephoto end becomes worse.

It is more desirable that the following formula (1-1) is satisfied:

$$5.4 < fpp/fw < 7.1 \tag{1-1}$$

When the value of fpn/fw is lower than the lower limit defined by the formula (2), lateral chromatic aberration at a wide angle end becomes worse. Further, at a telephoto end, spherical aberration is insufficiently corrected, and longitudinal chromatic aberration becomes worse. When the value of fpn/fw exceeds the upper limit defined by the formula (2), lateral chromatic aberration becomes worse through the entire range of variable magnification.

It is more desirable that the following formula (2-1) is satisfied:

$$-6.8 < fpn/fw < -6.2 \tag{2-1}$$

Further, it is desirable that the variable magnification optical system in an embodiment of the present invention has the following elements. The embodiment of the present invention may include one of the elements, or arbitrary plural elements in combination.

It is desirable that the plastic lens having positive refractive power in the second lens group G2 satisfies the following formula (3):

$$52.0 < vdpp < 58.0 \tag{3}$$

when vdpp is the Abbe number of the material of the plastic lens having positive refractive power in the second lens group G2 with respect to d-line (wavelength is 587.6 nm). The range of the Abbe number defined by the formula (3) is more effective when the plastic lens having positive refractive power is arranged on the most object side in the second lens group G2.

When the value of vdpp exceeds the upper limit defined by the formula (3), longitudinal chromatic aberration at a telephoto end becomes worse. When the value of vdpp is lower than the lower limit defined by the formula (3), lateral chromatic aberration at a wide angle end becomes worse, and performance of the variable magnification optical system deteriorates.

It is more desirable that the following formula (3-1) is satisfied:

$$54.0 < vdpp < 57.0 \tag{3-1}$$

It is desirable that the plastic lens having negative refractive power in the first lens group G1 satisfies the following formula (4):

$$vdpn > 54.0 \tag{4}$$

when vdpn is the Abbe number of the material of the plastic lens having negative refractive power in the first lens group G1 with respect to d-line. Further, the range of the Abbe number defined by the formula (4) is more effective when the plastic lens having negative refractive power is arranged on the most image side in the first lens group G1. When the value of vdpn is lower than the lower limit defined by the formula (4), longitudinal chromatic aberration at a telephoto end becomes worse, and the magnitude of aberration becomes unignorable.

it is more desirable that the following formula (4-1) is satisfied:

$$54.0 < vdpn < 57.0 \tag{4-1}$$

When the value of vdpn exceeds the upper limit defined by the formula (4-1), lateral chromatic aberration at a wide angle end becomes worse.

It is desirable that the following formula (5) is satisfied:

$$-1.2 \times 10^{-4} < pp(dn/dT) < -8.8 \times 10^{-5} \tag{5}$$

when a change in the refractive index of the plastic lens having positive power in the second lens group G2 with respect to e-line (wavelength is 546.07 nm) per a rise in temperature by 1 degree is pp(dn/dT). Selection of a material satisfying the formula (5) can suppress a change in performance caused by a fluctuation of temperature.

Further, it is more desirable that the following formula (5-1) is satisfied:

$$-10.0 \times 10^{-5} < pp(dn/dT) < -9.0 \times 10^{-5} \tag{5-1}$$

It is desirable that the following formula (6) is satisfied:

$$-1.2 \times 10^{-4} < pn(dn/dT) < -8.8 \times 10^{-5} \tag{6}$$

when a change in the refractive index of the plastic lens having negative power in the first lens group G1 with respect to e-line per a rise in temperature by 1 degree is pn(dn/dT). Selection of a material satisfying the formula (6) can suppress a change in performance of the variable magnification optical system caused by a fluctuation of temperature.

Further, it is more desirable that the following formula (6-1) is satisfied:

$$-10.0 \times 10^{-5} < pn(dn/dT) < -9.0 \times 10^{-5} \tag{6-1}$$

When the variable magnification optical system of the present invention needs to be resistant to various environmental conditions, it is desirable that a most-object-side lens and a most-image-side lens in the entire system of the variable magnification optical system are made of material other than plastic. When the variable magnification optical system is mounted on a surveillance camera or the like and used outdoors, a lens arranged on the most object side is constantly exposed to sun light. Therefore, if the lens is a plastic lens, there is a risk that the quality of the plastic lens deteriorates or changes. Further, dust adheres to a plastic lens by static electricity more easily than to a glass lens. Therefore, if the lens arranged on the most image side is a plastic lens, adhesion of dust onto the plastic lens may degrade the quality of an image.

When the variable magnification optical system of the present invention is mounted on a surveillance camera or the like, and used in tough environmental conditions, a change in performance of the variable magnification optical system caused by a fluctuation of temperature should be minimized. In such a case, the variable magnification optical system may include only two plastic lenses, i.e., the negative plastic lens in the first lens group G1 and the positive plastic lens in the second lens group G2. Alternatively, when a reduction in cost and a reduction in the weight of the variable magnification optical system are essential, the variable magnification optical system may include three or more plastic lenses.

When the variable magnification optical system of the present invention is used in tough environmental conditions, it is desirable that a multi-layer coating for protection is applied. Further, an anti-reflection coating for reducing ghost light during usage may be applied.

In the example illustrated in FIGS. 1A and 1B, optical member PP is arranged between the lens system and the image formation plane. Various filters, such as a low-pass filter and a filter that cuts a specific wavelength band component, or the like may be arranged as the optical member PP. Alternatively, the various filters or the like may be arranged between lenses. Further, instead of arranging the various filters or the like, a coating the action of which is similar to the action of the various filters or the like may be applied to a lens surface of at least one of the lenses.

Next, examples of numerical values of the variable magnification optical system of the present invention will be described. Cross sections of a variable magnification optical system in Example 1 are illustrated in FIGS. 1A and 1B. Further, cross sections of variable magnification optical systems in Examples 2, 3, 4, 5 and 6 are illustrated in FIGS. 2A and 2B, FIGS. 3A and 3B, FIGS. 4A and 4B, FIGS. 5A and 5B, and FIGS. 6A and 6B, respectively. The cross sections of Examples 2 through 6 are illustrated in a similar manner to the cross section of Example 1.

Table 1 shows lens data about the variable magnification optical system of Example 1, and Table 2 shows data about zoom in Example 1. Further, Table 3 shows data about aspheric surfaces in Example 1. Similarly, Tables 4 through 18 show lens data about the variable magnification optical systems of Examples 2 through 6, data about zoom and data about aspheric surfaces in Examples 2 through 6. The meanings of signs in the tables will be described by using Example 1. The meanings of signs in Examples 2 through 6 are basically similar to Example 1.

In the lens data of Table 1, column Si shows the surface number of the i-th surface (i=1, 2, 3, . . . ). The surface number of the object-side surface of a most-object-side element is 1, and surface numbers sequentially increase toward the image side. Column Ri shows the radius of curvature of the i-th surface, and column Di shows a distance between the i-th surface and the (i+1)th surface on optical axis Z. Column Ndj shows the refractive index of j-th (j=1, 2, 3, . . . ) optical element for d-line (wavelength is 587.6 nm). The number of the optical element located on the most object side is 1, and numbers represented by "j" sequentially increase toward the image side. Further, column vdj shows the Abbe number of the j-th optical element for d-line. Here, the sign of the radius of curvature is positive when a surface facing the object side is convex, and the sign of the radius of curvature is negative when a surface facing the image side is convex. The lens data include aperture stop St, optical member PP, and an image plane. In the column Si of surface numbers, the term "(APERTURE STOP)" and the term "(IMAGE PLANE)" are written for the surfaces corresponding to aperture stop St and image plane Sim, respectively, next to the surface numbers.

In the lens data of Table 1, "VARIABLE 1", "VARIABLE 2", and "VARIABLE 3" are written in the rows of distances between surfaces that change when magnification is changed. The "VARIABLE 1" represents a distance between the first lens group G1 and the aperture stop St. The "VARIABLE 2" represents a distance between the aperture stop St and the second lens group G2. Further, The "VARIABLE 3" represents a distance between the second lens group G2 and optical member PP.

The data about zoom in Table 2 show the focal length of the entire system for d-line, F-number, the full angle of view, and values of "VARIABLE 1", "VARIABLE 2" and "VARIABLE" at a wide angle end and at a telephoto end. In the lens data and the data about zoom, angles are represented by the unit of degrees, and lengths are represented by the unit of "mm". However, since optical systems are usable when they are proportionally enlarged or proportionally reduced, other appropriate units may be used.

In the lens data of Table 1, mark "*" is attached to the surface number of an aspheric surface. Table 1 shows, as the radius of curvature of an aspheric surface, the numerical value of the paraxial radius of curvature. The data about aspheric surfaces in Table 3 are aspheric coefficients for the aspheric surfaces. In the data about aspheric surfaces of Table 3, the numerical value "E-n" (n: integer) represents "×10$^{-n}$", and "E+n" represents "×10$^{n}$". Further, the aspheric coefficients are coefficients K, Am (m=2, 3, 4, . . . 20) in the following equation representing an aspheric surface:

$$Zd = C \cdot h^2 / \{1 + (1 - K \cdot C^2 \cdot h^2)^{1/2}\} + \Sigma Am \cdot h^m, \text{ where}$$

Zd: depth of a aspheric surface (length of a perpendicular from a point on an aspheric surface at height h to a flat plane that is perpendicular to an optical axis, the flat plane contacting with the vertex of the aspheric surface), h: height (distance from the optical axis to the lens surface), C: paraxial radius of curvature, and K, Am: aspheric coefficients (m=2, 3, 4, . . . 20).

TABLE 1

Example 1
Lens Data

| Si (SURFACE NUMBER) | Ri (RADIUS OF CURVATURE) | Di (DISTANCE BETWEEN SURFACES) | Ndj (REFRACTIVE INDEX) | vdj (Abbe NUMBER) |
|---|---|---|---|---|
| 1 | 28.9287 | 0.80 | 1.88300 | 40.8 |
| 2 | 5.8375 | 3.78 | | |
| 3 | −22.1161 | 2.33 | 1.92286 | 18.9 |
| 4 | −11.9207 | 0.19 | | |
| *5 | −26.8044 | 0.87 | 1.53389 | 56.0 |
| *6 | 17.2306 | VARIABLE 1 | | |
| 7(APERTURE STOP) | ∞ | VARIABLE 2 | | |
| *8 | 9.3187 | 2.00 | 1.53389 | 56.0 |
| *9 | 64.1782 | 0.18 | | |
| 10 | 12.3352 | 3.84 | 1.49700 | 70.2 |
| 11 | −12.3352 | 0.15 | | |
| 12 | 15.3355 | 1.19 | 1.92286 | 20.9 |
| 13 | 6.0835 | 0.55 | | |
| 14 | 8.5717 | 3.21 | 1.51742 | 52.4 |
| 15 | −43.7015 | VARIABLE 3 | | |
| 16 | ∞ | 2.00 | 1.51633 | 64.14 |
| 17 | ∞ | 3.82 | | |
| 18(IMAGE PLANE) | ∞ | | | |

TABLE 2

EXAMPLE 1
DATA ABOUT ZOOM

| | FOCAL LENGTH | Fno. | FULL ANGLE OF VIEW | VARIABLE1 | VARIABLE2 | VARIABLE3 |
|---|---|---|---|---|---|---|
| WIDE ANGLE END | 2.88 | 1.35 | 129 | 10.47 | 9.75 | 2.00 |
| TELEPHOTO END | 9.86 | 3.06 | 35 | 2.36 | 0.44 | 11.31 |

TABLE 3

EXAMPLE 1
DATA ABOUT ASPHERIC SURFACE

| SURFACE NUMBER | 8 | 9 | 10 | 11 |
|---|---|---|---|---|
| K | 5.953471E+00 | 1.131838E+01 | 1.795386E−00 | −3.466227E+02 |
| A2 | 0.000000E+00 | 0.000000E+00 | 0.000000E+00 | 0.000000E+00 |
| A3 | 1.499963E−03 | 4.097222E−04 | 4.305302E−04 | 9.138047E−04 |
| A4 | −4.809143E−03 | −3.581559E−03 | −5.538456E−04 | −3.610675E−04 |
| A5 | 1.253511E−03 | −1.858225E−04 | 1.214004E−04 | 5.916926E−04 |
| A6 | −2.960417E−04 | 4.205971E−04 | 1.685269E−06 | −1.895175E−04 |
| A7 | 6.814185E−05 | −1.170012E−04 | −2.010678E−05 | 1.614558E−05 |
| A8 | −2.196594E−06 | 1.326119E−05 | 3.662879E−06 | 4.247834E−06 |
| A9 | −1.930435E−06 | 1.012210E−06 | 3.611759E−07 | −6.940360E−07 |
| A10 | 1.186394E−07 | −3.761999E−07 | −5.858011E−09 | −6.934618E−08 |
| A11 | −5.401798E−09 | −7.374291E−08 | −3.742060E−08 | 1.056625E−08 |
| A12 | 9.447640E−09 | −1.941823E−09 | −1.470015E−09 | 3.365346E−10 |
| A13 | 2.533492E−09 | 8.496297E−09 | 8.001291E−10 | 8.847324E−11 |
| A14 | −4.432403E−10 | 5.062277E−10 | 1.687258E−10 | −3.477673E−11 |
| A15 | −1.856245E−10 | −9.119680E−11 | 1.517606E−13 | −1.286186E−12 |
| A16 | −1.321709E−11 | −5.369298E−11 | −2.422240E−12 | 8.942555E−14 |
| A17 | 1.054292E−11 | −2.386431E−11 | −1.741159E−12 | 3.323559E−13 |
| A18 | 2.148406E−12 | 3.607016E−12 | 6.531521E−14 | −3.773573E−15 |
| A19 | −8.415343E−13 | 1.263090E−12 | 6.934769E−14 | −1.136408E−14 |
| A20 | 6.314542E−14 | −1.832252E−13 | −6.889380E−15 | 8.716830E−16 |

TABLE 4

Example 2
Lens Data

| Si (SURFACE NUMBER) | Ri (RADIUS OF CURVATURE) | Di (DISTANCE BETWEEN SURFACES) | Ndj (REFRACTIVE INDEX) | vdj (Abbe NUMBER) |
|---|---|---|---|---|
| 1 | 28.4959 | 0.80 | 1.88300 | 40.8 |
| 2 | 5.8187 | 3.83 | | |
| 3 | −21.0526 | 2.37 | 1.92286 | 18.9 |
| 4 | −11.6573 | 0.17 | | |
| *5 | −26.8787 | 0.87 | 1.53389 | 56.0 |
| *6 | 17.2028 | VARIABLE 1 | | |
| 7(APERTURE STOP) | ∞ | VARIABLE 2 | | |
| *8 | 9.2563 | 2.12 | 1.53389 | 56.0 |
| *9 | 95.0052 | 0.22 | | |
| 10 | 14.2416 | 3.81 | 1.49700 | 70.2 |
| 11 | −11.6292 | 0.29 | | |
| 12 | 16.5095 | 1.28 | 1.92286 | 20.9 |
| 13 | 6.0664 | 0.45 | | |
| 14 | 7.8677 | 2.81 | 1.51742 | 52.4 |
| 15 | −51.8737 | VARIABLE 3 | | |
| 16 | ∞ | 2.00 | 1.51633 | 64.14 |
| 17 | ∞ | 4.92 | | |
| 18(IMAGE PLANE) | ∞ | | | |

TABLE 5

EXAMPLE 2
DATA ABOUT ZOOM

|  | FOCAL LENGTH | Fno. | FULL ANGLE OF VIEW | VARIABLE1 | VARIABLE2 | VARIABLE3 |
|---|---|---|---|---|---|---|
| WIDE ANGLE END | 2.88 | 1.35 | 129 | 10.28 | 9.94 | 1.00 |
| TELEPHOTO END | 9.95 | 3.09 | 34 | 2.21 | 0.53 | 10.41 |

TABLE 6

EXAMPLE 2
DATA ABOUT ASPHERIC SURFACE

| SURFACE NUMBER | 5 | 6 | 8 | 9 |
|---|---|---|---|---|
| K   | 6.774423E+00  | 1.119753E+01  | 1.862106E+00  | −6.630475E+02 |
| A2  | 0.000000E+00  | 0.000000E+00  | 0.000000E+00  | 0.000000E+00 |
| A3  | 1.600038E−03  | 5.587273E−04  | 3.423141E−04  | 7.763481E−04 |
| A4  | −4.862788E−03 | −3.652943E−03 | −5.705539E−04 | −3.882487E−04 |
| A5  | 1.286542E−03  | −1.812058E−04 | 1.191411E−04  | 5.861538E−04 |
| A6  | −2.993790E−04 | 4.316680E−04  | 7.257455E−06  | −1.889802E−04 |
| A7  | 6.644692E−05  | −1.191672E−04 | −2.011651E−05 | 1.606126E−05 |
| A8  | −2.148143E−06 | 1.300505E−05  | 3.646955E−06  | 4.228764E−06 |
| A9  | −1.889766E−06 | 1.045549E−06  | 3.626404E−07  | −6.914470E−07 |
| A10 | 1.270135E−07  | −3.852205E−07 | −4.911684E−09 | −6.985015E−08 |
| A11 | −6.880858E−09 | −7.071523E−08 | −3.754873E−08 | 1.044537E−08 |
| A12 | 9.216154E−09  | −2.684307E−09 | −1.506339E−09 | 3.254007E−10 |
| A13 | 2.476911E−09  | 8.697219E−09  | 7.936180E−10  | 9.060268E−11 |
| A14 | −4.280795E−10 | 5.566698E−10  | 1.680782E−10  | −3.440360E−11 |
| A15 | −1.846924E−10 | −1.000219E−10 | 1.811318E−13  | −1.475586E−12 |
| A16 | −1.281410E−11 | −5.547934E−11 | −2.394757E−12 | 3.585212E−14 |
| A17 | 1.050096E−11  | −2.386869E−11 | −1.743654E−12 | 3.377405E−13 |
| A18 | 2.132583E−12  | 3.616916E−12  | 6.445597E−14  | −3.622037E−15 |
| A19 | −8.414734E−13 | 1.265895E−12  | 6.950955E−14  | −1.111491E−14 |
| A20 | 6.333726E−14  | −1.824693E−13 | −6.890454E−15 | 8.627451E−16 |

TABLE 1

Example 3
Lens Data

| Si (SURFACE NUMBER) | Ri (RADIUS OF CURVATURE) | Di (DISTANCE BETWEEN SURFACES) | Ndj (REFRACTIVE INDEX) | vdj (Abbe NUMBER) |
|---|---|---|---|---|
| 1 | 28.4505 | 0.80 | 1.83481 | 42.7 |
| 2 | 5.7455 | 3.91 | | |
| 3 | −20.4822 | 2.52 | 1.92286 | 18.9 |
| 4 | −11.8262 | 0.15 | | |
| *5 | −25.4383 | 0.89 | 1.53389 | 56.0 |
| *6 | 17.2028 | VARIABLE 1 | | |
| 7(APERTURE STOP) | ∞ | VARIABLE 2 | | |
| *8 | 9.2624 | 2.09 | 1.53389 | 56.0 |
| *9 | 98.0090 | 0.21 | | |
| 10 | 14.2416 | 3.83 | 1.49700 | 70.2 |
| 11 | −11.6040 | 0.28 | | |
| 12 | 16.5120 | 1.29 | 1.92286 | 20.9 |
| 13 | 6.0500 | 0.43 | | |
| 14 | 7.8066 | 2.81 | 1.51742 | 52.4 |
| 15 | −55.8756 | VARIABLE 3 | | |
| 16 | ∞ | 2.00 | 1.51633 | 64.14 |
| 17 | ∞ | 3.93 | | |
| 18(IMAGE PLANE) | ∞ | | | |

TABLE 8

EXAMPLE 3
DATA ABOUT ZOOM

| | FOCAL LENGTH | Fno. | FULL ANGLE OF VIEW | VARIABLE1 | VARIABLE2 | VARIABLE3 |
|---|---|---|---|---|---|---|
| WIDE ANGLE END | 2.88 | 1.35 | 130 | 10.22 | 9.96 | 1.00 |
| tELEPHOTO END | 9.95 | 3.09 | 34 | 2.25 | 0.54 | 10.43 |

TABLE 9

EXAMPLE 3
DATA ABOUT ASPHERIC SURFACE

| SURFACE NUMBER | 5 | 6 | 8 | 9 |
|---|---|---|---|---|
| K | 6.797169E+00 | 1.113190E+01 | 1.872214E+00 | −7.966624E+02 |
| A2 | 0.000000E+00 | 0.000000E+00 | 0.000000E+00 | 0.000000E+00 |
| A3 | 1.690115E−03 | 5.903695E−04 | 3.373007E−04 | 7.883984E−04 |
| A4 | −4.844460E−03 | −3.619851E−03 | −5.713705E−04 | −3.874020E−04 |
| A5 | 1.288979E−03 | −1.783945E−04 | 1.193600E−04 | 5.867937E−04 |
| A6 | −2.988457E−04 | 4.321703E−04 | 5.225916E−09 | −1.888646E−04 |
| A7 | 6.653208E−05 | −1.191667E−04 | −2.012106E−05 | 1.594259E−05 |
| A8 | −2.132228E−06 | 1.300604E−05 | 3.648657E−06 | 4.232457E−06 |
| A9 | −1.899319E−06 | 1.035810E−06 | 3.618930E−07 | −6.904024E−07 |
| A10 | 1.252518E−07 | −3.872813E−07 | −5.006173E−09 | −6.968316E−08 |
| A11 | −6.891840E−09 | −7.048325E−08 | −3.757674E−08 | 1.040330E−08 |
| A12 | 9.207481E−09 | −2.697074E−09 | −1.510417E−09 | 3.179460E−10 |
| A13 | 2.478313E−09 | 8.714362E−09 | 7.934193E−10 | 9.100040E−11 |
| A14 | −4.278824E−10 | 5.602324E−10 | 1.680477E−10 | −3.433110E−11 |
| A15 | −1.841579E−10 | −1.003549E−10 | 1.948112E−13 | −1.523752E−12 |
| A16 | −1.271159E−11 | −5.553430E−11 | −2.392512E−12 | 3.397321E−14 |
| A17 | 1.049333E−11 | −2.385137E−11 | −1.743675E−12 | 3.380721E−13 |
| A18 | 2.131344E−12 | 3.615462E−12 | 6.443885E−14 | −3.550523E−15 |
| A19 | −8.417231E−13 | 1.265635E−12 | 6.949752E−14 | −1.110818E−14 |
| A20 | 6.329888E−14 | −1.824941E−13 | −6.892922E−15 | 8.641556E−16 |

TABLE 10

Example 4
Lens Data

| Si (SURFACE NUMBER) | Ri (RADIUS OF CURVATURE) | Di (DISTANCE BETWEEN SURFACES) | Ndj (REFRACTIVE INDEX) | vdj (Abbe NUMBER) |
|---|---|---|---|---|
| 1 | 28.4901 | 0.80 | 1.83481 | 42.7 |
| 2 | 5.7559 | 3.96 | | |
| 3 | −19.3501 | 2.40 | 1.92286 | 18.9 |
| 4 | −11.6975 | 0.15 | | |
| *5 | −27.1630 | 0.87 | 1.53389 | 56.0 |
| *6 | 17.2028 | VARIABLE 1 | | |
| 7(APERTURE STOP) | ∞ | VARIABLE 2 | | |
| *8 | 9.2738 | 2.06 | 1.53389 | 56.0 |
| *9 | 91.1202 | 0.21 | | |
| 10 | 14.3328 | 3.95 | 1.51633 | 64.14 |
| 11 | −11.7011 | 0.21 | | |
| 12 | 16.8068 | 1.23 | 1.92286 | 20.9 |
| 13 | 6.0408 | 0.47 | | |
| 14 | 7.9881 | 2.75 | 1.51742 | 52.4 |
| 15 | −61.6774 | VARIABLE 3 | | |
| 16 | ∞ | 2.00 | 1.51633 | 64.14 |
| 17 | ∞ | 4.00 | | |
| 18(IMAGE PLANE) | ∞ | | | |

TABLE 11

EXAMPLE 4
DATA ABOUT ZOOM

| | FOCAL LENGTH | Fno. | FULL ANGLE OF VIEW | VARIABLE1 | VARIABLE2 | VARIABLE3 |
|---|---|---|---|---|---|---|
| WIDE ANGLE END | 2.88 | 1.34 | 129 | 10.18 | 10.02 | 1.00 |
| TELEPHOTO END | 9.95 | 3.08 | 34 | 2.24 | 0.58 | 10.44 |

TABLE 12

EXAMPLE 4
DATA ABOUT ASPHERIC SURFACE

| SURFACE NUMBER | 5 | 6 | 8 | 9 |
|---|---|---|---|---|
| K | 6.876170E+00 | 1.119860E+01 | 1.871471E+00 | −6.314412E+02 |
| A2 | 0.000000E+00 | 0.000000E+00 | 0.000000E+00 | 0.000000E+00 |
| A3 | 1.728443E−03 | 4.130874E−04 | 3.127396E−04 | 7.759135E−04 |
| A4 | −4.866560E−03 | −3.570209E−03 | −5.817302E−04 | −3.839830E−04 |
| A5 | 1.286906E−03 | −1.831351E−04 | 1.171114E−04 | 5.859652E−04 |
| A6 | −2.993836E−04 | 4.313983E−04 | 5.204458E−08 | −1.888632E−04 |
| A7 | 6.657827E−05 | −1.192158E−04 | −2.012057E−05 | 1.592164E−05 |
| A8 | −2.115133E−06 | 1.299108E−05 | 3.650065E−06 | 4.229923E−06 |
| A9 | −1.898337E−06 | 1.036066E−06 | 3.594175E−07 | −6.904442E−07 |
| A10 | 1.254334E−07 | −3.872264E−07 | −5.332051E−09 | −7.085308E−08 |
| A11 | −6.907043E−09 | −7.017867E−08 | −3.763142E−08 | 1.044235E−08 |
| A12 | 9.195224E−09 | −2.662544E−09 | −1.517505E−09 | 3.247659E−10 |
| A13 | 2.473900E−09 | 8.707441E−09 | 7.924400E−10 | 9.225095E−11 |
| A14 | −4.283802E−10 | 5.589061E−10 | 1.679454E−10 | −3.413615E−11 |
| A15 | −1.842876E−10 | −1.005781E−10 | 2.583332E−13 | −1.501826E−12 |
| A16 | −1.269350E−11 | −5.558093E−11 | −2.381605E−12 | 3.746071E−14 |
| A17 | 1.049333E−11 | −2.384998E−11 | −1.743222E−12 | 3.368503E−13 |
| A18 | 2.129442E−12 | 3.614773E−12 | 6.451073E−14 | −3.787380E−15 |
| A19 | −8.415721E−13 | 1.265951E−12 | 6.949171E−14 | −1.107976E−14 |
| A20 | 6.338386E−14 | −1.824599E−13 | −6.895964E−15 | 8.700801E−16 |

TABLE 13

Example 5
Lens Data

| Si (SURFACE NUMBER) | Ri (RADIUS OF CURVATURE) | Di (DISTANCE BETWEEN SURFACES) | Ndj (REFRACTIVE INDEX) | vdj (Abbe NUMBER) |
|---|---|---|---|---|
| 1 | 29.2156 | 0.80 | 1.80400 | 46.6 |
| 2 | 5.9021 | 3.78 | | |
| 3 | −19.6320 | 2.35 | 1.92286 | 18.9 |
| 4 | −11.5030 | 0.23 | | |
| *5 | −26.0591 | 0.87 | 1.53389 | 56.0 |
| *6 | 17.2028 | VARIABLE1 | | |
| 7(APERTURE STOP) | ∞ | VARIABLE2 | | |
| *8 | 9.1403 | 2.15 | 1.53389 | 56.0 |
| *9 | 12917.8305 | 0.26 | | |
| 10 | 14.5155 | 3.81 | 1.49700 | 70.2 |
| 11 | −11.3167 | 0.10 | | |
| 12 | 16.9020 | 1.07 | 1.92286 | 20.9 |
| 13 | 6.0667 | 0.53 | | |
| 14 | 8.3088 | 3.00 | 1.51742 | 52.4 |
| 15 | −47.8604 | VARIABLE3 | | |
| 16 | ∞ | 2.00 | 1.51633 | 64.14 |
| 17 | ∞ | 3.80 | | |
| 18(IMAGE PLANE) | ∞ | | | |

TABLE 14

EXAMPLE 5
DATA ABOUT ZOOM

|  | FOCAL LENGTH | Fno. | FULL ANGLE OF VIEW | VARIABLE1 | VARIABLE2 | VARIABLE3 |
|---|---|---|---|---|---|---|
| WIDE ANGLE END | 3.05 | 1.35 | 123 | 10.32 | 9.35 | 1.00 |
| TELEPHOTO END | 10.08 | 2.93 | 34 | 1.89 | 0.64 | 9.70 |

TABLE 15

EXAMPLE 5
DATA ABOUT ASPHERIC SURFACE

| SURFACE NUMBER | 5 | 6 | 8 | 9 |
|---|---|---|---|---|
| K | 1.536604E+01 | 1.098660E+01 | 1.672772E+00 | −6.294515E+28 |
| A2 | 0.000000E+00 | 0.000000E+00 | 0.000000E+00 | 0.000000E+00 |
| A3 | 1.667339E−03 | 5.990897E−04 | 2.158884E−04 | 6.200810E−04 |
| A4 | −5.094958E−03 | −3.815821E−03 | −5.594017E−04 | −4.462140E−04 |
| A5 | 1.322841E−03 | −1.720734E−04 | 1.163872E−04 | 5.816167E−04 |
| A6 | −2.941293E−04 | 4.360131E−04 | −1.284938E−06 | −1.890958E−04 |
| A7 | 6.557575E−05 | −1.187658E−04 | −2.001156E−05 | 1.629314E−05 |
| A8 | −2.158377E−06 | 1.298081E−05 | 3.674752E−06 | 4.260005E−06 |
| A9 | −1.893465E−06 | 1.026974E−06 | 3.674812E−07 | −7.009920E−07 |
| A10 | 1.276026E−07 | −3.912692E−07 | −5.611062E−09 | −6.904555E−08 |
| A11 | −7.183363E−09 | −6.952044E−08 | −3.772506E−08 | 9.948444E−09 |
| A12 | 9.127444E−09 | −3.327524E−09 | −1.543898E−09 | 3.200213E−10 |
| A13 | 2.520750E−09 | 8.768913E−09 | 7.852366E−10 | 8.254407E−11 |
| A14 | −4.278846E−10 | 5.765232E−10 | 1.654024E−10 | −3.355736E−11 |
| A15 | −1.838340E−10 | −1.050044E−10 | 2.029149E−13 | −1.514041E−12 |
| A16 | −1.338855E−11 | −5.534135E−11 | −2.321581E−12 | 9.335833E−14 |
| A17 | 1.055161E−11 | −2.364666E−11 | −1.726467E−12 | 3.326002E−13 |
| A18 | 2.147372E−12 | 3.612996E−12 | 6.505956E−14 | −2.848615E−15 |
| A19 | −8.410354E−13 | 1.277601E−12 | 6.952816E−14 | −1.120180E−14 |
| A20 | 6.290973E−14 | −1.854122E−13 | −7.012009E−15 | 8.562071E−16 |

TABLE 16

Example 6
Lens Data

| Si (SURFACE NUMBER) | Ri (RADIUS OF CURVATURE) | Di (DISTANCE BETWEEN SURFACES) | Ndj (REFRACTIVE INDEX) | vdj (Abbe NUMBER) |
|---|---|---|---|---|
| 1 | 28.1465 | 0.80 | 1.72916 | 54.7 |
| 2 | 5.8647 | 3.92 | | |
| 3 | −16.9338 | 2.67 | 1.84661 | 23.8 |
| 4 | −11.2809 | 0.20 | | |
| *5 | −24.7902 | 0.88 | 1.50957 | 56.4 |
| *6 | 17.2028 | VARIABLE1 | | |
| 7(APERTURE STOP) | ∞ | VARIABLE2 | | |
| *8 | 9.4244 | 2.11 | 1.50957 | 56.4 |
| *9 | 16261.8303 | 0.10 | | |
| 10 | 15.0264 | 4.08 | 1.49700 | 70.2 |
| 11 | −11.1286 | 0.10 | | |
| 12 | 15.5354 | 1.23 | 1.92286 | 20.9 |
| 13 | 6.2132 | 0.50 | | |
| 14 | 8.4681 | 2.74 | 1.51742 | 52.4 |
| 15 | −40.0042 | VARIABLE3 | | |
| 16 | ∞ | 2.00 | 1.51633 | 64.1 |
| 17 | ∞ | 3.80 | | |
| 18(IMAGE PLANE) | ∞ | | | |

TABLE 17

EXAMPLE 6
DATA ABOUT ZOOM

|  | FOCAL LENGTH | Fno. | FULL ANGLE OF VIEW | VARIABLE1 | VARIABLE2 | VARIABLE3 |
|---|---|---|---|---|---|---|
| WIDE ANGLE END | 3.10 | 1.35 | 122 | 10.00 | 8.25 | 1.00 |
| TELEPHOTO END | 9.30 | 2.65 | 37 | 1.54 | 0.82 | 8.40 |

TABLE 18

EXAMPLE 6
DATA ABOUT ASPHERIC SURFACE

| SURFACE NUMBER | 5 | 6 | 8 | 9 |
|---|---|---|---|---|
| K   | 1.407044E+01  | 1.126557E+01  | 1.582502E+00  | −8.762786E+33 |
| A2  | 0.000000E+00  | 0.000000E+00  | 0.000000E+00  | 0.000000E+00 |
| A3  | 2.195490E−03  | 9.024371E−04  | 1.799551E−04  | 6.537373E−04 |
| A4  | −5.295119E−03 | −3.872061E−03 | −5.632745E−04 | −4.923630E−04 |
| A5  | 1.343402E−03  | −1.742916E−04 | 1.113337E−04  | 5.803290E−04 |
| A6  | −2.925946E−04 | 4.394039E−04  | −1.425018E−06 | −1.897687E−04 |
| A7  | 6.558536E−05  | −1.190888E−04 | −2.058962E−05 | 1.593446E−05 |
| A8  | −2.225015E−06 | 1.290478E−05  | 3.695751E−06  | 4.227654E−06 |
| A9  | −1.886348E−06 | 1.039112E−06  | 3.702771E−07  | −7.100859E−07 |
| A10 | 1.266826E−07  | −3.914077E−07 | −5.290590E−09 | −6.949856E−08 |
| A11 | −7.574544E−09 | −7.017678E−08 | −3.802690E−08 | 1.060043E−08 |
| A12 | 9.102987E−09  | −3.311133E−09 | −1.495702E−09 | 2.633022E−10 |
| A13 | 2.515682E−09  | 8.767263E−09  | 7.826989E−10  | 8.727182E−11 |
| A14 | −4.365779E−10 | 5.835622E−10  | 1.645247E−10  | −3.071276E−11 |
| A15 | −1.788872E−10 | −1.030492E−10 | 3.966008E−14  | −1.525002E−12 |
| A16 | −1.326680E−11 | −5.521848E−11 | −2.255800E−12 | 3.761581E−14 |
| A17 | 1.053555E−11  | −2.363610E−11 | −1.725204E−12 | 3.331230E−13 |
| A18 | 2.122143E−12  | 3.585338E−12  | 6.612122E−14  | −3.037283E−15 |
| A19 | −8.408500E−13 | 1.278926E−12  | 6.955786E−14  | −1.140185E−14 |
| A20 | 6.318507E−14  | −1.857924E−13 | −7.089990E−15 | 8.725049E−16 |

The schematic structure of the variable magnification optical system of Example 1 will be described. In the variable magnification optical system of Example 1, the first lens group G1 is composed of three lenses L11, L12, L13, and the second lens group G2 is composed of four lenses L21, L22, L23, L24. These lens groups and lenses are arranged from the object side of the variable magnification optical system in the order mentioned above. In the first lens group G1, lens L11 has a negative meniscus shape having a convex surface facing the object side, and lens L12 has a positive meniscus shape having a convex surface facing the image side. Further, lens L13 has a double-concave shape in the paraxial region thereof. In the second lens group G2, lens L21 has a positive meniscus shape having a convex surface facing the object side in the paraxial region thereof, and lens L22 has a double convex shape. Further, lens L23 has a negative meniscus shape having a convex surface facing the object side, and lens L24 has a double-convex shape. Further, both surfaces of the lens L13, and both surfaces of the lens L21 are aspheric. The lens L13 and the lens L21 are plastic lenses. Aperture stop St is fixed when magnification is changed. The schematic structures of the variable magnification optical systems in Examples 2 through 6 are similar to the structure of Example 1.

FIGS. 7A through 7D are diagrams illustrating spherical aberration, astigmatism, distortion and lateral chromatic aberration (chromatic aberration of magnification) of the variable magnification optical system of Example 1 at a wide angle end, respectively. Further, FIGS. 7E through 7H are diagrams illustrating spherical aberration, astigmatism, distortion and lateral chromatic aberration (chromatic aberration of magnification) of the variable magnification optical system of Example 1 at a telephoto end, respectively. These diagrams illustrate aberrations with respect to d-line. In the diagrams illustrating spherical aberrations, aberrations with respect to g-line (wavelength is 435.8 nm) and C-line (wavelength is 656.3 nm) are also illustrated. In the diagrams illustrating lateral chromatic aberrations, aberrations related to g-line and C-line are illustrated. In the diagrams illustrating astigmatism, aberrations with respect to a sagittal direction are indicated by solid lines, and aberrations with respect to a tangential direction are indicated by dotted lines. In the diagrams illustrating spherical aberrations, "Fno." represents an F-number. In the other diagrams, "w" represents a half angle of view.

Similarly, FIGS. 8A through 8H, FIGS. 9A through 9H, FIGS. 10A through 10H, FIGS. 11A through 11H, and FIGS. 12A through 12H are diagrams illustrating aberrations of the variable magnification optical systems of Examples 2 through 6, respectively. These diagrams illustrate aberrations at a wide angle end and at a telephoto end.

Table 19 shows values corresponding to the formulas (1) through (6) with respect to the variable magnification optical systems of Examples 1 through 6. In Table 19, values related to the formulas (1) through (4) are values with respect to d-line, and values related to the formulas (5) and (6) are values with respect to e-line.

TABLE 19

| | FORMURA(1) fpp/fw | FORMURA(2) fpn/fw | FORMURA(3) ν dpp | FORMURA(4) ν dpn | FORMURA(5) pp(dn/dT) | FORMURA(6) pn(dn/dT) |
|---|---|---|---|---|---|---|
| EXAMPLE1 | 6.96 | −6.74 | 56.0 | 56.0 | $-9.2 \times 10^{-5}$ | $-9.2 \times 10^{-5}$ |
| EXAMPLE2 | 6.58 | −6.74 | 56.0 | 56.0 | $-9.2 \times 10^{-5}$ | $-9.2 \times 10^{-5}$ |
| EXAMPLE3 | 6.56 | −6.59 | 56.0 | 56.0 | $-9.2 \times 10^{-5}$ | $-9.2 \times 10^{-5}$ |
| EXAMPLE4 | 6.62 | −6.77 | 56.0 | 56.0 | $-9.2 \times 10^{-5}$ | $-9.2 \times 10^{-5}$ |
| EXAMPLE5 | 5.59 | −6.28 | 56.0 | 56.0 | $-9.2 \times 10^{-5}$ | $-9.2 \times 10^{-5}$ |
| EXAMPLE6 | 5.97 | −6.38 | 56.4 | 56.4 | $-1.1 \times 10^{-4}$ | $-1.1 \times 10^{-4}$ |

In all of Examples 1 through 6, the variable magnification optical system is a seven-lens lens system including two plastic lenses. Further, the size of the variable magnification optical system is small, and the variable magnification optical system is producible at low cost. The variable magnification optical system in each of Examples 1 through 6 satisfies the formulas (1) through (6). Further, the variable magnification optical system in each of the examples has a full angle of view in the range of 122 to 130° at a wide angle end, while the F-number of approximately 1.3 is maintained at a wide angle end, which means a large relative aperture. Further, each aberration is corrected in an excellent manner in the variable magnification optical systems, and the optical performance of the variable magnification optical systems is excellent.

Figure 13:
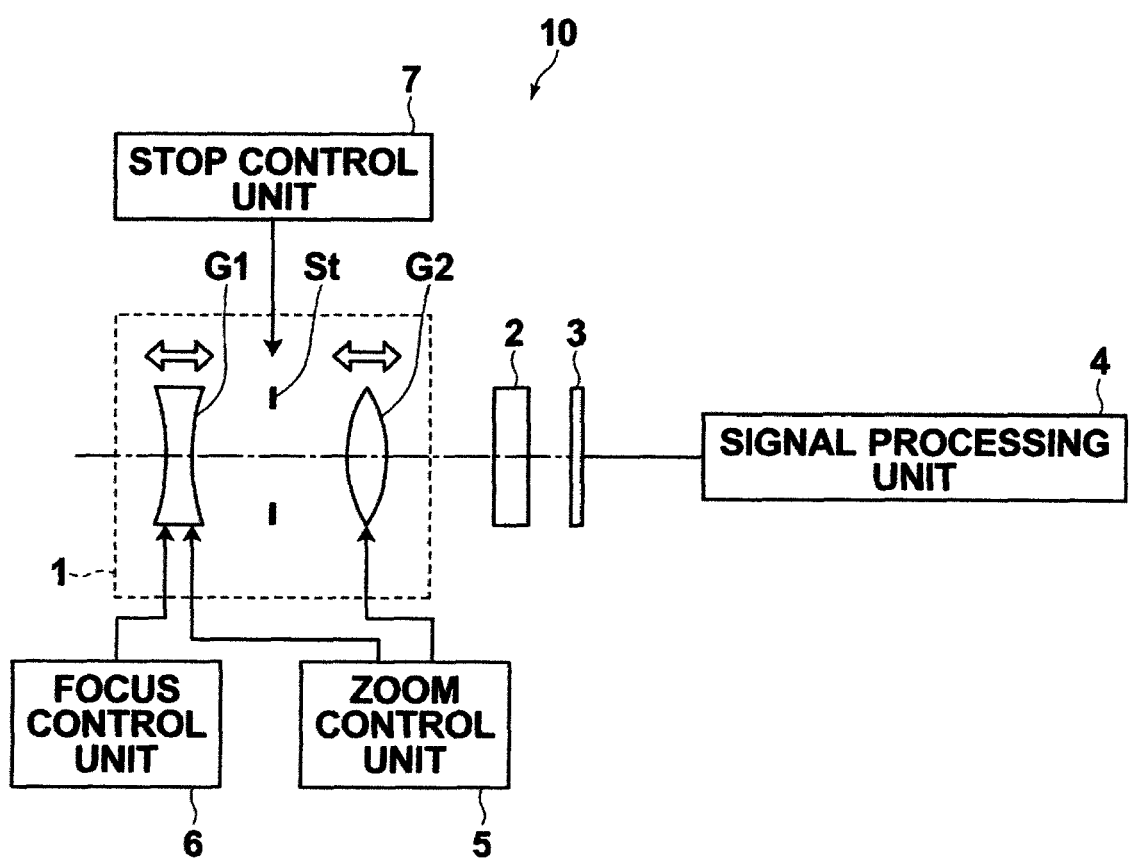
FIG. 13 is a schematic diagram illustrating the configuration of an imaging apparatus according to an embodiment of the present invention.

FIG. 13 is a schematic diagram illustrating the configuration of an imaging apparatus using a variable magnification optical system according to an embodiment of the present invention. Examples of the imaging apparatus are a monitor or surveillance camera, a video camera, an electronic still camera, and the like.

An imaging apparatus 10 illustrated in FIG. 13 includes a variable magnification optical system 1, a filter 2, an imaging device 3, and a signal processing unit 4. The filter 2 is arranged on the image side of the variable magnification optical system 1, and the imaging device 3 images an image of a subject formed by the variable magnification optical system 1. The signal processing unit 4 performs operation processing on a signal output from the imaging device 3. The variable magnification optical system 1 is composed of negative first lens group G1, aperture stop St, and positive second lens group G. In FIG. 13, the lens groups are illustrated conceptually. The imaging device 3 converts an optical image formed by the variable magnification optical system 1 into electrical signals. The imaging device 3 is arranged so that the imaging plane of the imaging device 3 and the image plane of the variable magnification optical system 1 become the same. A CCD, a CMOS or the like, for example, may be used as the imaging device 3.

Further, the imaging apparatus 10 includes a zoom control unit 5, a focus control unit 6, and a stop control unit 7. The zoom control unit 5 changes the magnification of the variable magnification optical system 1. The focus control unit 6 adjusts the focus of the variable magnification optical system 1. The stop control unit 7 changes the diameter of an aperture of the aperture stop St. In the example illustrated in FIG. 13, focus is adjusted by moving the first lens group G1. However, the method for adjusting focus is not limited to this method.

So far, the present invention has been described by using embodiments and examples. However, the present invention is not limited to the embodiments and the examples, and various medications are possible. For example, values, such as the radius of curvature of each lens element, a distance between surfaces, a refractive index, Abbe number, and aspheric coefficients, are not limited to the values in the examples of numerical values, but may be other values.

What is claimed is:

1. A variable magnification optical system comprising:
a first lens group having negative refractive power;
a stop; and
a second lens group having positive refractive power, which are arranged from the object side of the variable magnification optical system in the order mentioned above,
wherein the magnification of the variable magnification optical system is changed by changing a distance between the first lens group and the second lens group in the direction of an optical axis, and
wherein the first lens group includes a plastic lens having negative refractive power, and
wherein the second lens group includes a plastic lens having positive refractive power, and
wherein the following formulas (1) and (2) are satisfied:

$$5.0 < fpp/fw < 7.5 \quad (1); \text{ and}$$

$$-7.0 < fpn/fw < -6.0 \quad (2), \text{ where}$$

fpn is the focal length of the plastic lens having negative refractive power,
fpp is the focal length of the plastic lens having positive refractive power, and
fw is the focal length of the entire system of the variable magnification optical system at a wide angle end.

2. A variable magnification optical system, as defined in claim 1, wherein the first lens group is composed three lenses of a negative lens, a positive lens and a negative lens, which are arranged from the object side in the order mentioned above.

3. A variable magnification optical system, as defined in claim 1, wherein the second lens group is composed of four lenses.

4. A variable magnification optical system, as defined in claim 1, wherein the plastic lens having positive refractive power is arranged on the most object side in the second lens group, and wherein the following formula (3) is satisfied:

$$52.0 < vdpp < 58.0 \quad (3), \text{ where}$$

vdpp is the Abbe number of the material of the plastic lens having positive refractive power with respect to d-line.

5. A variable magnification optical system, as defined in claim 1, wherein the plastic lens having negative refractive power is arranged on the most image side in the first lens group, and
wherein the following formula (4) is satisfied:

$$vdpn > 54.0 \quad (4), \text{ where}$$

vdpn is the Abbe number of the material of the plastic lens having negative refractive power with respect to d-line.

6. A variable magnification optical system, as defined in claim 1, wherein each of the plastic lens having positive refractive power and the plastic lens having negative refractive power has at least one aspheric surface.

7. A variable magnification optical system, as defined in claim 1, wherein when the magnification of the variable magnification optical system is changed from a wide angle end to a telephoto end, the first lens group moves from the image side of the variable magnification optical system to the object side of the variable magnification optical system after moving from the object side to the image side.

8. A variable magnification optical system, as defined in claim 1, where a most-object-side lens and a most-image-side lens in the entire system of the variable magnification optical system are made of material other than plastic.

9. An imaging apparatus comprising:
   a variable magnification optical system, as defined in claim 1.

* * * * *